United States Patent [19]

Kawakami et al.

[11] Patent Number: 5,535,208
[45] Date of Patent: Jul. 9, 1996

[54] DATA TRANSMISSION SYSTEM AND METHOD

[75] Inventors: Yasunori Kawakami, Osaka; Hiroyuki Iitsuka; Takuya Nishimura, both of Katano; Shinji Hamai, Osaka; Yasuyuki Sahara, Hirakata, all of Japan

[73] Assignee: Matsushita Electric Industrial Co., Ltd., Osaka, Japan

[21] Appl. No.: 399,587

[22] Filed: Mar. 7, 1995

[30] Foreign Application Priority Data

Mar. 9, 1994  [JP]  Japan ..................... 6-038243
Mar. 22, 1994 [JP]  Japan ..................... 6-050262

[51] Int. Cl.⁶ ..................................... H04J 3/17
[52] U.S. Cl. ............... 370/84; 358/434; 358/437; 370/85.7
[58] Field of Search .................. 358/434, 437, 358/439; 455/54.2, 58.1; 340/825.04, 825.15; 178/4.1 R, 4.1 B, 41.1 C; 370/79, 84, 85.7, 95.1, 58.1, 82

[56] References Cited

U.S. PATENT DOCUMENTS 2,503,727  4/1950  Grondahl et al. ................ 455/58.1
4,112,467  9/1978  Ogawa ........................... 358/437
5,239,385  8/1993  Ejiri ............................ 358/434
5,239,543  8/1993  Janssens ......................... 370/82
5,331,316  7/1994  Mestdagh et al. ............... 370/95.1
5,355,230 10/1994  Kaneko ......................... 358/434
5,371,607 12/1994  Hannia et al. .................. 358/434
5,428,819  6/1995  Wang et al. .................... 455/58.1

OTHER PUBLICATIONS

"IEEE Standard for a High Performance Serial Bus", Draft 7.1v1, IEEE P1394, published by the Institute of Electrical and Electronic Engineers on Aug. 5, 1994.

Primary Examiner—Benedict V. Safourek
Attorney, Agent, or Firm—Greenblum & Bernstein

[57] ABSTRACT

The data transmission method employs IEEE P1394 protocol. The data header of the transmitted isochronous packet is added with a node identifier identifying the transmitter node, so that the receiver node can immediately identify the transmitter node, and can thereby request the transmitter node to maintain transmission. A Broadcast channel is a default channel used for isochronous packet transmission, unless a different channel number is otherwise specified. Thus, it is not necessary for the user to coordinate the channel number used by the transmitting and receiver nodes. It is also not necessary for the transmitter node to notify the receiver node, or the receiver node to notify the transmitter node, of the channel number used.

16 Claims, 16 Drawing Sheets

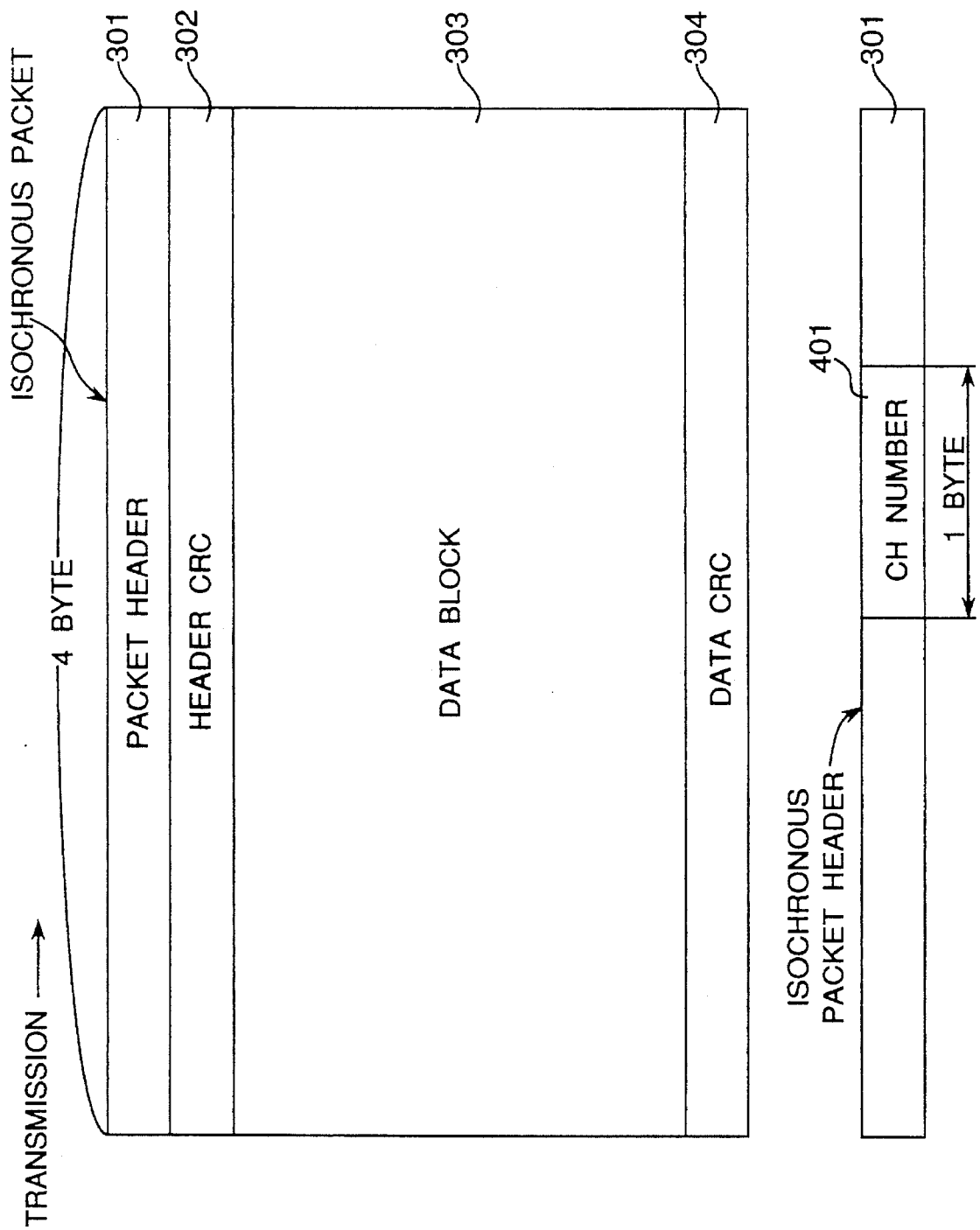

DATA TRANSMISSION SYSTEM AND METHOD

BACKGROUND OF THE INVENTION

1. Field of the invention

The present invention relates to a system for transmitting audio signals and/or video signals as a digital signal in such applications as a digital video cassette recorder (VCR) whereby audio signals and/or video signals are recorded and reproduced as digital signals, and also to a method thereof.

2. Description of the prior art

Devices for transmitting audio signals and/or video signals via a digital signal transmission path are being continually developed. Transmitting audio signals and/or video signals as a digital signal, however, requires sending and receiving to be synchronized to the processing speed of the apparatus, and therefore requires a transmission path capable of isochronous transmission. A bus connection is even more preferable considering the potential need for two-way communications on a single transmission path whereby plural devices can receive a signal transmitted from a single device.

The Institute of Electrical and Electronic Engineers, Inc. (IEEE) is currently studying a next-generation high speed serial bus protocol under the title P1394 (see "High Performance Serial Bus"). Under the proposed IEEE P1394 standard, isochronous transmission data, including audio signals, video signals, and other real-time data, can be transmitted by isochronous transmission using isochronous packets, which are sent and received every 125 μsec (=1 cycle) to achieve isochronous transmission.

The isochronous transmission control method of IEEE P1394 is described next. When the bus is initialized according to IEEE P1394, a node identifier is automatically assigned to each device connected to the bus (each 'node') as a means of identifying each node. A maximum 64 isochronous packets per cycle can also be sent over the bus. As a result, each isochronous packet is also assigned a channel number ranging in value from 0 to 63 to identify each isochronous packet. To achieve isochronous transmission on plural channels, one of the plural nodes connected to the bus is used for isochronous transmission management; this node is called the "bus manager" below.

The bus manager manages the channel numbers used for isochronous transmission, and the time remaining in each cycle usable for isochronous transmission. The time sharing rate, or the time slot width, required for each node to transmit an isochronous packet in one cycle is referred to as a bandwidth below. To achieve isochronous transmission, the bus manager must reserve the channel number and the bandwidth to be used. It should be noted that communications not essential to isochronous transmission and information that does not require isochronous transmission are transmitted by asynchronous transmission using asynchronous packets. Asynchronous communication is accomplished using cycle time not used for isochronous transmission.

The bus is also immediately reinitialized whenever a node is connected or disconnected from the bus, or whenever any node on the bus is turned off, to enable active bus configuration.

The first problem addressed by the present invention is described next.

When the IEEE P1394 high performance serial bus is applied to isochronous transmission between consumer audio-visual (A/V) devices using the conventional isochronous packet described above, it is not possible for the node receiving the isochronous packet to identify the node sending that isochronous packet.

Because of this node identification problem, the node receiving the isochronous packet cannot request the node sending the isochronous packet to continue isochronous packet transmission when it is necessary to prevent interruption of isochronous transmission due to an unexpected user action, and it is therefore not possible to set the transmission node to a protected state.

This is described below referring to a system comprising nodes A, B, and C with node B assumed to be receiving and recording the isochronous packet sent by node A. If the user then performs some action causing node C to transmit an isochronous packet, node C must request node A to stop transmitting the isochronous packet. If node A responds to this request by stopping transmission, the recording operation of node B will be interrupted. It is therefore possible by this conventional data transmission method to interrupt the transmission of isochronous packets between communicating nodes when one node not associated with that isochronous packet transmission is accidentally or improperly operated.

The second problem is described next. As described above, the IEEE P1394 protocol enables plural channels of real-time data to be output during one cycle. It is therefore necessary for the receiver node(s) to determine the channel numbers of the real-time data that should be received by that node. One method of enabling the receiver node to determine the channel numbers to be received is for the user to inform the receiver node of the channel numbers to be received. To do this, however, the user must determine and inform the receiver node of the channel numbers of the real-time data that should be received, and this increases the burden on the user.

SUMMARY OF THE INVENTION

Therefore, a data transmission method according to the present invention for resolving the first problem described above, a node identifier identifying the node transmitting the isochronous packet is added to each isochronous packet.

To handle requests to continue transmission from a plurality of receiver nodes, the transmitter node enters a protected state when one or more continuation requests is received from one or more receiver nodes, and cancels the protected state when the number of "stop enable" flags received is at least equal to the number of continuation requests received.

By a data transmission method thus comprised, the receiver node can immediately identify the node transmitting the isochronous packet by simply reading the node identifier of the transmitter node contained in each received isochronous packet.

In addition, by identifying the transmitter node, the receiver node can send a continuation request to the transmitter node as may be required, and can send a stop enable flag when it is no longer necessary to continue transmitting. Each time the transmitter node receives a continuation request, the transmitter node increments a protect counter, and decrements the protect counter each time a stop enable flag is received. When the value of the protect counter is not zero, the transmitter node can prevent interruption of isochronous transmission due to an unexpected user operation by rejecting any stop transmission requests received from another node.

A data transmission method for resolving the second problem of the prior art described above is described below.

In this data transmission method for transmitting real-time data using a bus system capable of handling a plurality of channels of real-time data by adding the channel number of each data packet to the data in form of a channel identifier, the transmitter node comprises a step whereby the transmitter node obtains the Broadcast channel, which is a fixed channel N, and the bandwidth required to transmit the real-time data; a step for determining whether the Broadcast channel and the bandwidth have been obtained; and a step for starting real-time data transmission using the Broadcast channel and permitted bandwidth. The receiver node in this method comprises a step whereby receiving real-time data from the real-time data packet of the Broadcast channel is started.

By this second invention, the channel number used by the A/V devices is fixed, and unless a different channel number is specified by an external device, this fixed, or default, channel number is used for data transmissions. In other words, unless the receiver node is specified by an external device, it is possible for each A/V device to constantly receive all real-time data transmitted on the Broadcast channel. It is therefore not necessary for the user to inform the receiver node of the channel number to be received during isochronous transmission.

BRIEF DESCRIPTION OF THE DRAWINGS

The present invention will become more fully understood from the detailed description given below and the accompanying diagrams wherein:

FIG. 3 shows the isochronous packet format defined by IEEE P1394;

FIG. 4 shows the format of the packet header of the isochronous packet defined by IEEE P1394;

DESCRIPTION OF PREFERRED EMBODIMENTS

Figure 1:
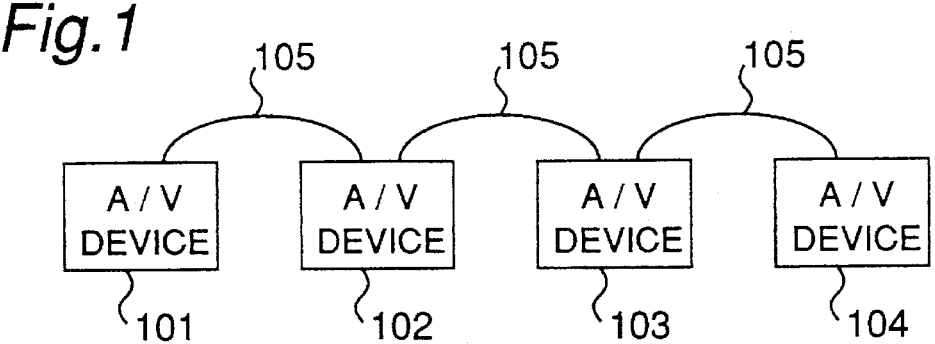
FIG. 1 is a block diagram of plural audio/visual devices connected to a bus according to the IEEE P1394 protocol.

The present invention relates to a transmission procedure for transmitting real-time data such as audio/visual data using the P1394 protocol currently being considered by the Institute of Electrical and Electronic Engineers, Inc. FIG. 1 shows a plurality of audio/visual devices connected to a bus according to the IEEE P1394 protocol. In this example, four audio/visual devices are connected to a common bus, and the devices are referred to as nodes. A/V devices 101, 102, 103, and 104 are connected by a cable 105 which serves as a bus structure.

Figure 2:
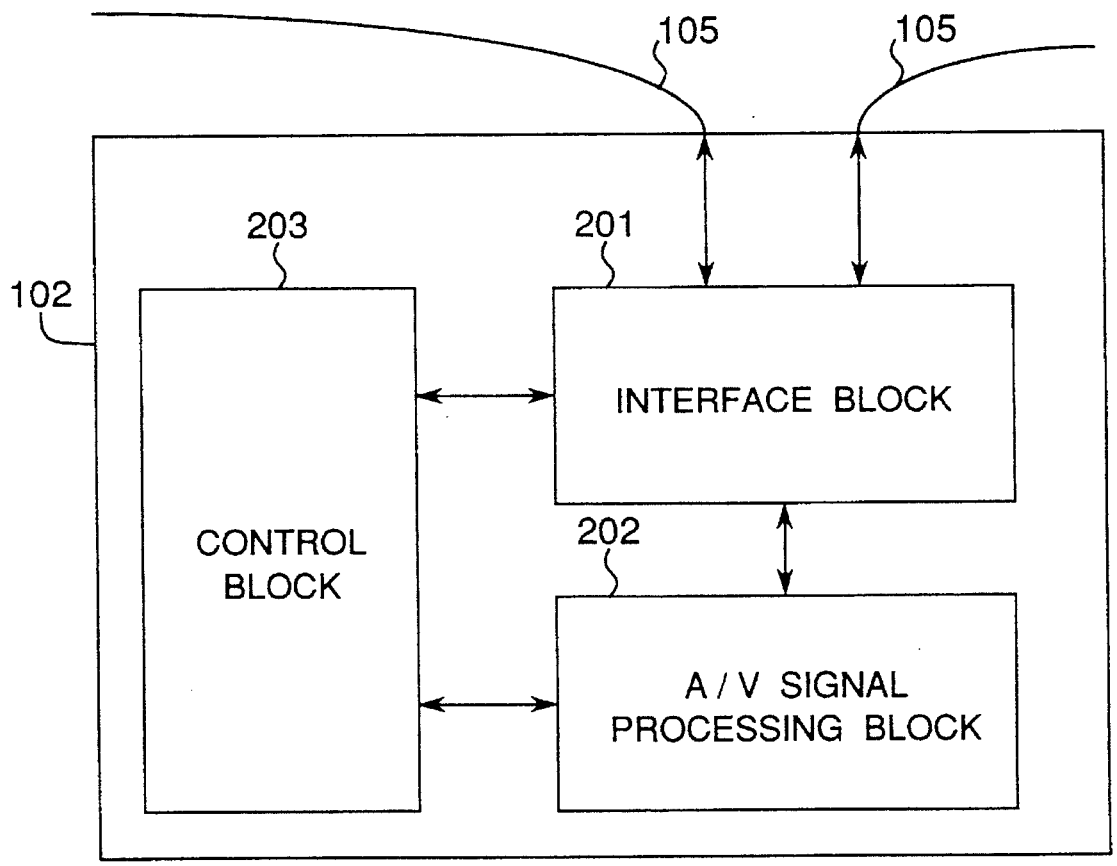
FIG. 2 is a block diagram of the internal configuration of each audio/visual device shown in FIG. 1.

The A/V devices 101–104 have a similar control arrangement which is shown in FIG. 2 by way of example for A/V device 102. Each A/V device comprises an interface block 201, an A/V signal processing block 202, and a control block 203. Signals from the other nodes are input to one A/V device 102 through the interface block 201. In the interface block 201, the input signals have their waveform shaped, and the waveform-shaped signals are output to the next A/V device 103. The interface block 201 is capable of transmitting the output signals from any other A/V device, i.e., any other node when connected according to the IEEE P1394 protocol as shown in FIG. 1, to all other A/V devices (nodes).

In the IEEE P1394 protocol, real-time data is transmitted using isochronous packets, the format of which is shown in FIG. 3 as defined by IEEE P1394.

Each isochronous packet comprises a 4-byte packet header 301; a 4-byte header CRC 302 for checking for transmission errors in the packet header 301; a data block 303; and a 4-byte data CRC 304 for checking for transmission errors in the real-time data.

The format of the packet header 301 is shown in FIG. 4. As shown in FIG. 4, the packet header 301 includes the channel number 401. According to the IEEE P1394 protocol, plural A/V devices (nodes) can transmit plural isochronous packets on a time-share basis approximately every 125 μsec (=1 cycle). The channel number 401 is added to the isochronous packets for identifying each packet transmitted during the same cycle.

When transmitting real-time data, the control block 203 instructs the A/V signal processing block 202 to output the real-time data, including the audio/visual data. Based on the instructions from the control block 203, the A/V signal processing block 202 therefore outputs the real-time data. The control block 203 also adds the channel number used and other information, and controls isochronous packet output to the interface block 201.

Based on the instructions from the control block 203, the interface block 201 packetizes the real-time data from the A/V signal processing block 202 as the data block 303 shown in FIG. 3 according to the packet format also shown in FIG. 3. The interface block 201 then outputs the isochronous packet to the other nodes (A/V devices).

When receiving real-time data, the control block 203 informs the interface block 201 of the channel number of the isochronous packets to be received. The interface block 201 then detects the channel number of each isochronous packet from the packet header. If the detected channel number is the specified channel number, the interface block 201 outputs to the A/V signal processing block 202 the real-time data contained in the data block 303 from the isochronous packet shown in FIG. 3. The control block 203 also controls input of the real-time data to the A/V signal processing block 202, which signal processes the input data.

It is therefore possible for plural nodes to transmit plural isochronous packets during the same cycle by the IEEE P1394 protocol as described above, i.e., plural isochronous transmission between plural nodes can be accomplished in an apparently simultaneous manner. It is necessary, however, to reserve sufficient bandwidth for the internal processing speed of each node with each isochronous transmission. Here, the bandwidth means a width of a reserved time slot in each cycle of 125 μsec, and various time slots in each cycle are distinguished by different channel numbers. According to the IEEE P1394 protocol, it is possible to use, at the maximum, 64 different channel numbers, from 0 to 63. Because the maximum transmittable bandwidth is limited (obviously less than 125 μsec), it is necessary to manage the bandwidth used by each node. In addition, a channel number is added to each isochronous packet to identify each isochronous packet and thereby enable isochronous transmission of data on plural channels. Managing the channel numbers used by each node is necessary to prevent the same channel number from being assigned to packets on different channels when plural nodes simultaneously output isochronous packets. This channel number duplication is prevented in the IEEE P1394 protocol by dedicating one node as a bus manager for centrally controlling bandwidth and channel numbers. A/V devices or other node devices executing isochronous transmission must receive from the bus manager the specific bandwidth and channel number used by that node for isochronous transmission. Note that the "used bandwidth" defines the amount of time in each cycle that the node outputting the isochronous packet can monopolize the bus to send the isochronous packets.

Figure 5:
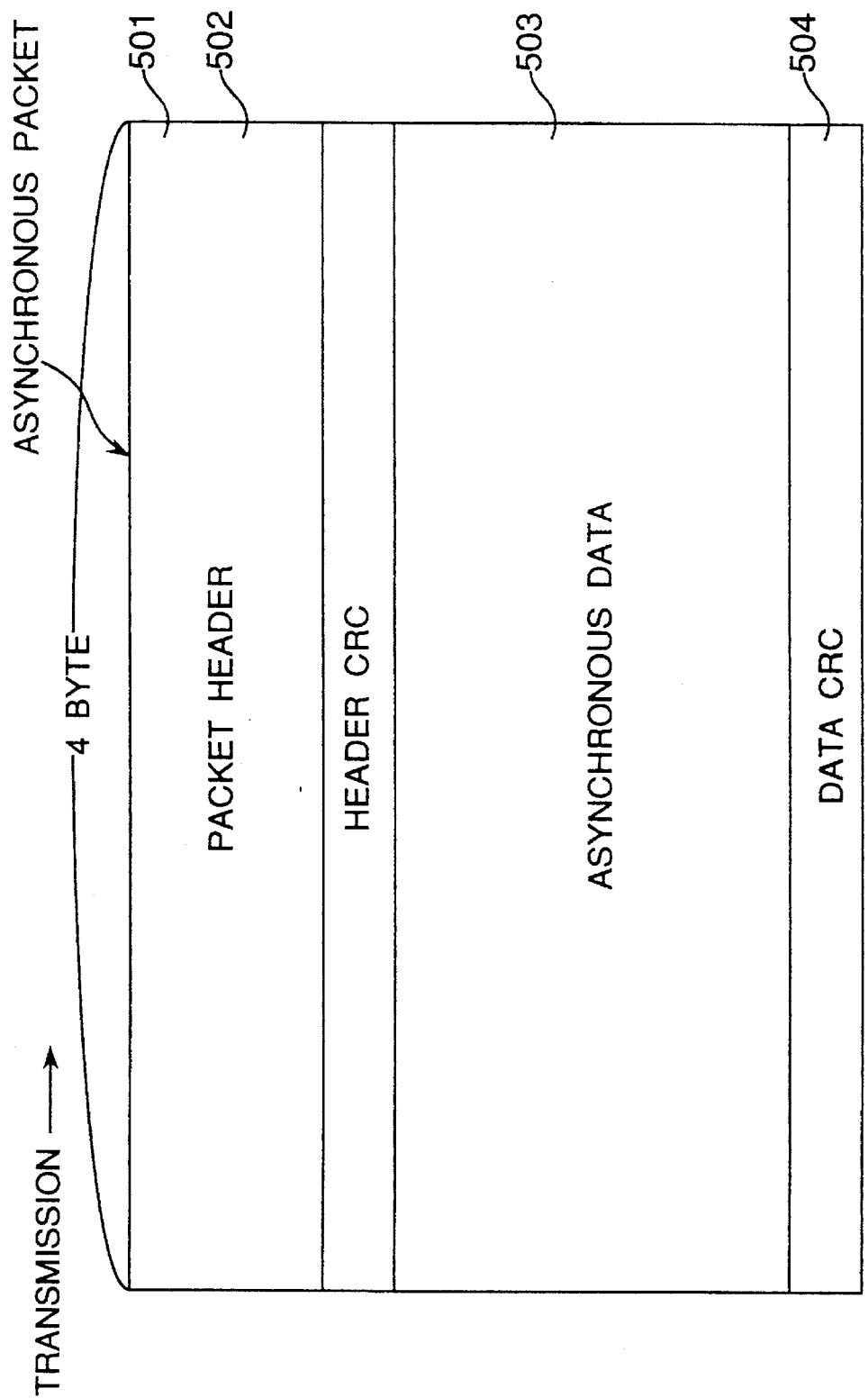
FIG. 5 shows the asynchronous packet format defined by IEEE P1394.
Figure 6:
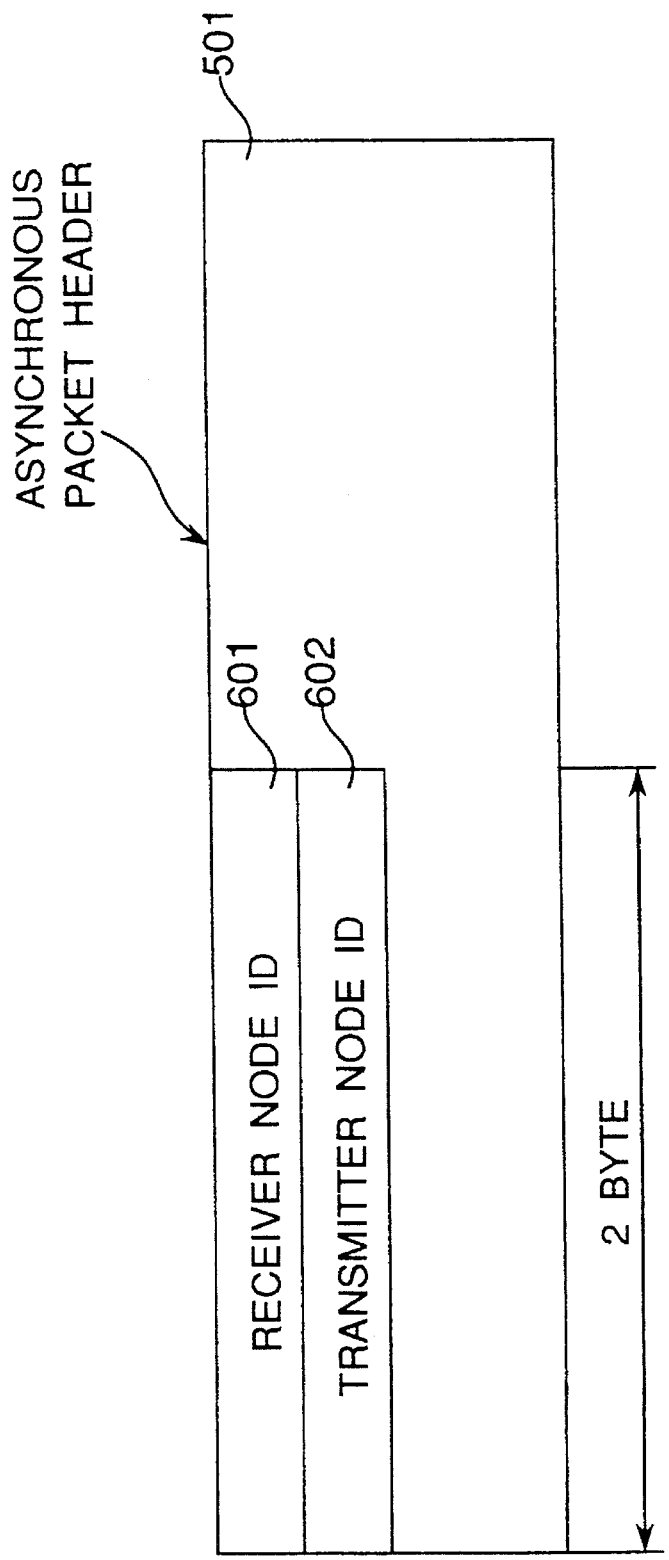
FIG. 6 shows the format of the packet header of the asynchronous packet defined by IEEE P1394.

Communications other than the isochronous transmission described above, e.g., communications for obtaining the used bandwidth and channel number, are accomplished by asynchronous transmission using asynchronous packets. Asynchronous transmission is accomplished using the cycle time remaining after isochronous transmission is completed in each cycle. FIG. 5 shows the asynchronous packet format defined by IEEE P1394.

Each asynchronous packet comprises a 16-byte packet header 501; a 4-byte header CRC 502 for checking for transmission errors in the packet header 501; an asynchronous data body 503; and a 4-byte data CRC 504 for checking for transmission errors in the asynchronous transmission data. The packet header 501 comprises a receiver node identifier 601, which is the identifier of the node to which the transmitted asynchronous packet is addressed, and a transmitter node identifier 602, which is the identifier of the node transmitting the packet. The receiver node identifier 601 and the transmitter node identifier 602 in the packet header are each two bytes long. The receiver node receives all asynchronous packets in which the value of the receiver node identifier 601 is equal to the node identifier of the receiver node. The receiver node can also determine by the transmitter node identifier 602 in the received asynchronous packets which node sent the asynchronous packet by reading the transmitter node identifier 602.

The procedure for asynchronous transmission is described next. To send an asynchronous packet, the control block 203 instructs the interface block 201 to asynchronously transmit the asynchronous transmission data after appending the receiver node identifier identifying the addressed node. The interface block 201 thus generates and outputs the asynchronous packets from the asynchronous data, receiver node identifier, and other information input from the control block 203. When an asynchronous packet is received, the interface block 201 identifies the asynchronous packets addressed to that node by evaluating the receiver node identifier 601 contained in the packet header 501, and outputs the asynchronous data 503 and the transmitter node identifier 602 from the received asynchronous packet to the control block 203. The control block 203 then executes the required processing based on the asynchronous data input thereto.

Referring to FIGS. 7 to 10, the first embodiment of the present invention is described below. Note that the first embodiment is described with specific application to a video cassette recorder (VCR) as the A/V device.

Figure 7:
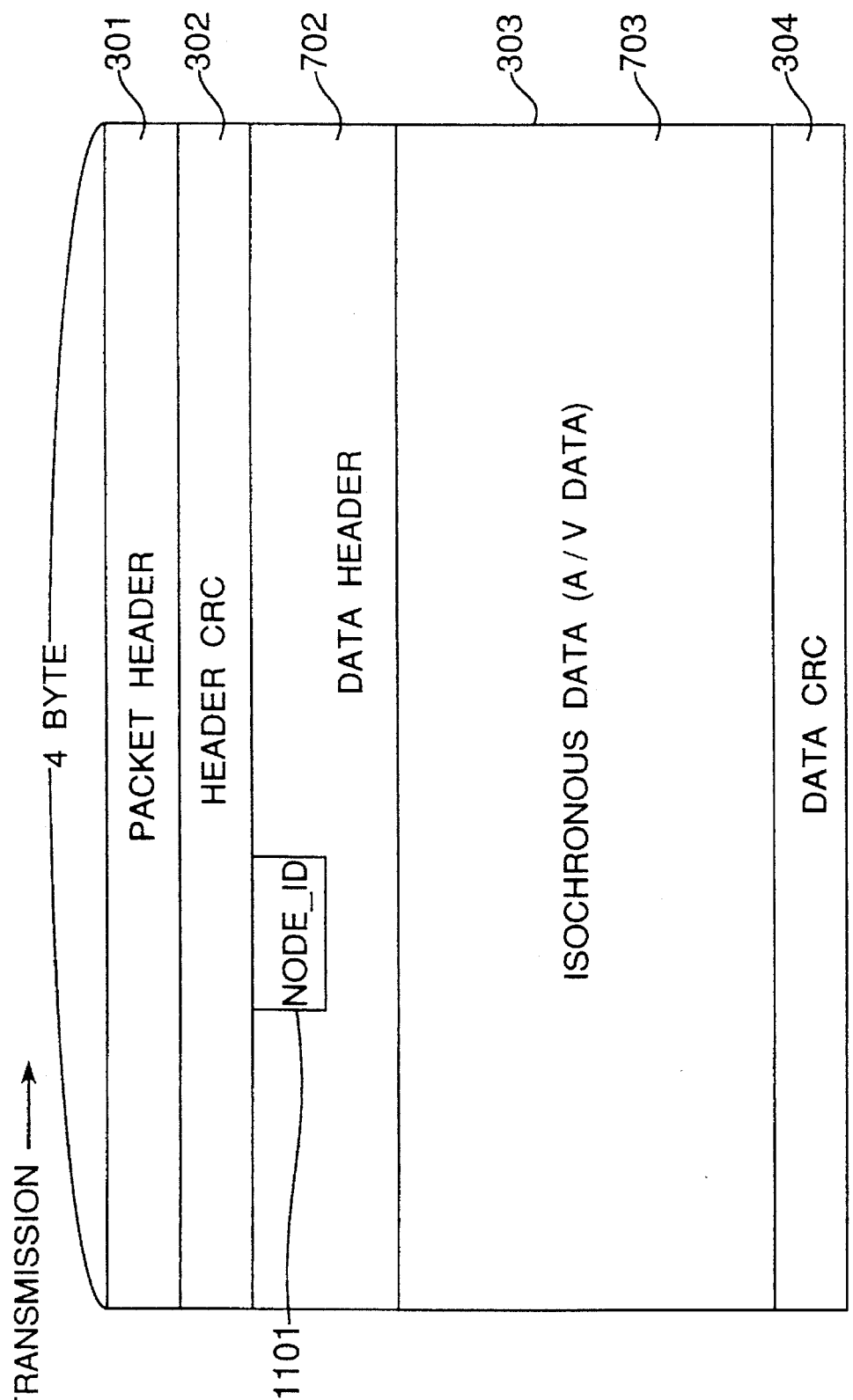
FIG. 7 shows the isochronous packet format according to the first embodiment of the present invention.

FIG. 7 shows the format of an isochronous packet transmitted during isochronous transmission by the first embodiment of the invention.

Referring to FIG. 7, data block 303 is used to communicate any data the user wishes to communicate, and comprises a data header 702 identifying the type of data transmitted in that isochronous packet, and the A/V data 703 actually transmitted. The data header 702 comprises the node identifier 1101 identifying the node that transmitted that isochronous packet, and other header data. Thus, by detecting and reading the node identifier 1101 at the receiver node, it is possible to detect who is the transmitter node.

When a new node is connected and a bus reset is generated according to the IEEE P1394 protocol, a new node identifier is automatically assigned to that newly connected node. As a result, the node transmitting the isochronous packet writes the node identifier assigned thereto to the data header 702 according to the format shown in FIG. 7, and then transmits the isochronous packet.

Figure 8:
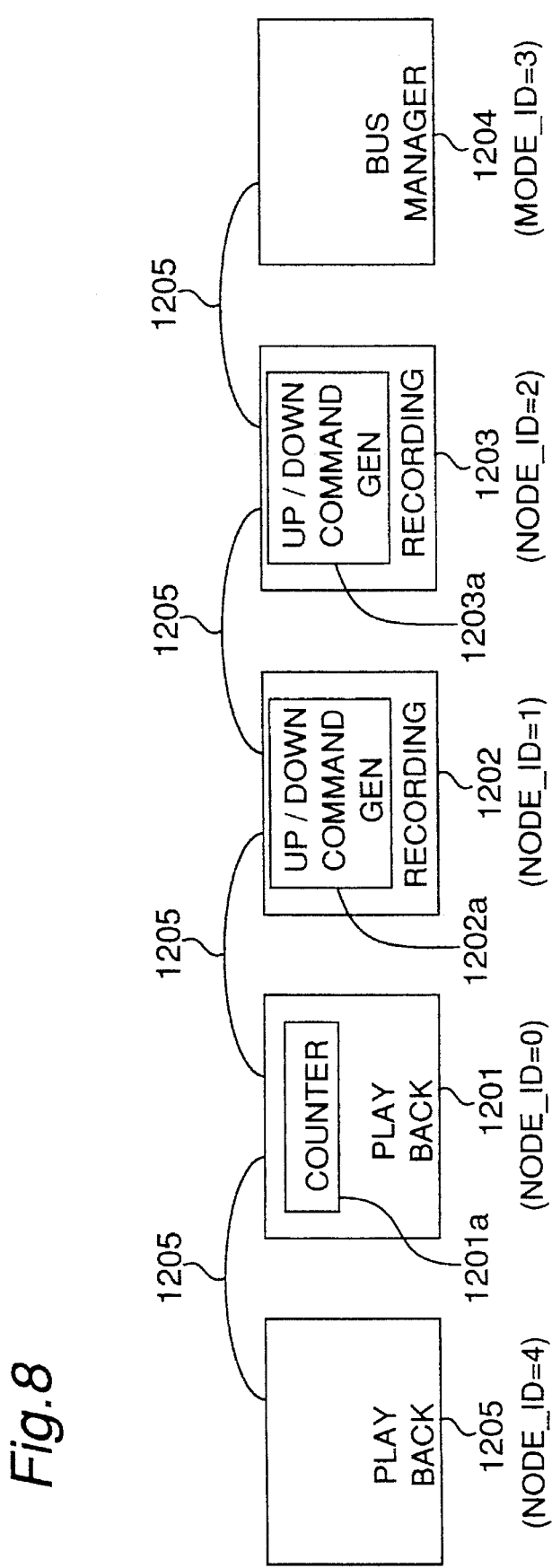
FIG. 8 is a block diagram of a VCR connection according to the second embodiment of the present invention.

FIG. 8 shows how five VCRs may be connected for dubbing A/V data. The operation of each of the five VCRs 1201–1205 is controlled by the control block 203 built in to each VCR. Note that the control block 203 of the present invention is achieved by a microcomputer. The VCRs 1201–1205 are connected by connector cables 1205. Each time a cable is connected, a 'bus reset' command is generated to assign the node identifiers to the VCRs 1201–1205. Node identifiers (node—ID) 0–4 are assigned to VCRs 1201–1205, respectively, by way of example only in the following description.

As noted above, packet sending and receiving is executed on a 125 μsec cycle according to the IEEE P1394 protocol, and the first half of each cycle can be assigned to a priority time band for isochronous transmission. It is therefore necessary to reserve the bandwidth required within the finite priority time band reserved for isochronous transmission. More specifically, it is necessary to first determine which communications channel is to be used for what length of time for isochronous packet transmission. Managing this priority time band is also handled by the node used as the bus manager node 1204.

It is assumed in the following description that A/V data reproduced by the first VCR 1201 is to be dubbed by VCRs 1202 and 1203, and that VCR 1204 is the bus manager node managing the priority time band. (VCR 1205 will be used for the description of the second embodiment.) The execution of the present embodiment is described below by these three function blocks. Data other than the A/V data used in the following description, e.g. continuation requests and stop enable flags sent from the receiver node to the transmitter node, are communicated using asynchronous packets. In the control block 203 of VCR 1201 serving as a play device, a counter 1201a is provided. In the control block 203 of VCRs 1202 and 1203 each serving as a recording device, up/down command generators 1202a and 1203a are provided, respectively. The up/down command generator 1202a or 1203a generates an up command, it means that the VCR 1202 or 1203 will continue to stay in the recording mode, and when it generates a down command, it means that the VCR 1202 or 1203 is released from the recording mode. For example, when the up/down command generator 1202a generates an up command, the counter 1201a which was before in the reset condition, is incremented from "0" to "1" indicating that there is one VCR which will continue to record the data sending from this player 1201. Thereafter, when the up/down command generator 1203a generates an up command, the counter 1201a now carrying "1" is incremented to "2" indicating that there is two VCRs which will continue to record the data sending from this player 1201. Thereafter, when the up/down command generator 1203a generates a down command, the counter 1201a now carrying "2" is decremented to "2" indicating that there is one VCRs which will continue to record the data sending from this player 1201. When the counter 1201a is carrying a number other than "0" such as "1" or "2" the player 1201 is in a protect mode so that the play mode will not be stopped by an internal stop command, but stops only by an external stop command. Here, the internal stop command is a command transmitted along the bus from some other VCR; and the external stop command is a command given directly by hand to the VCR, such as by the depression of a STOP button (not shown), or by the power cut off. The up command can be considered as a continuation request to continue the play mode of the player, or a protect transmission request to protect the transmission of play until all the recording VCRs stop recording.

Figure 9:
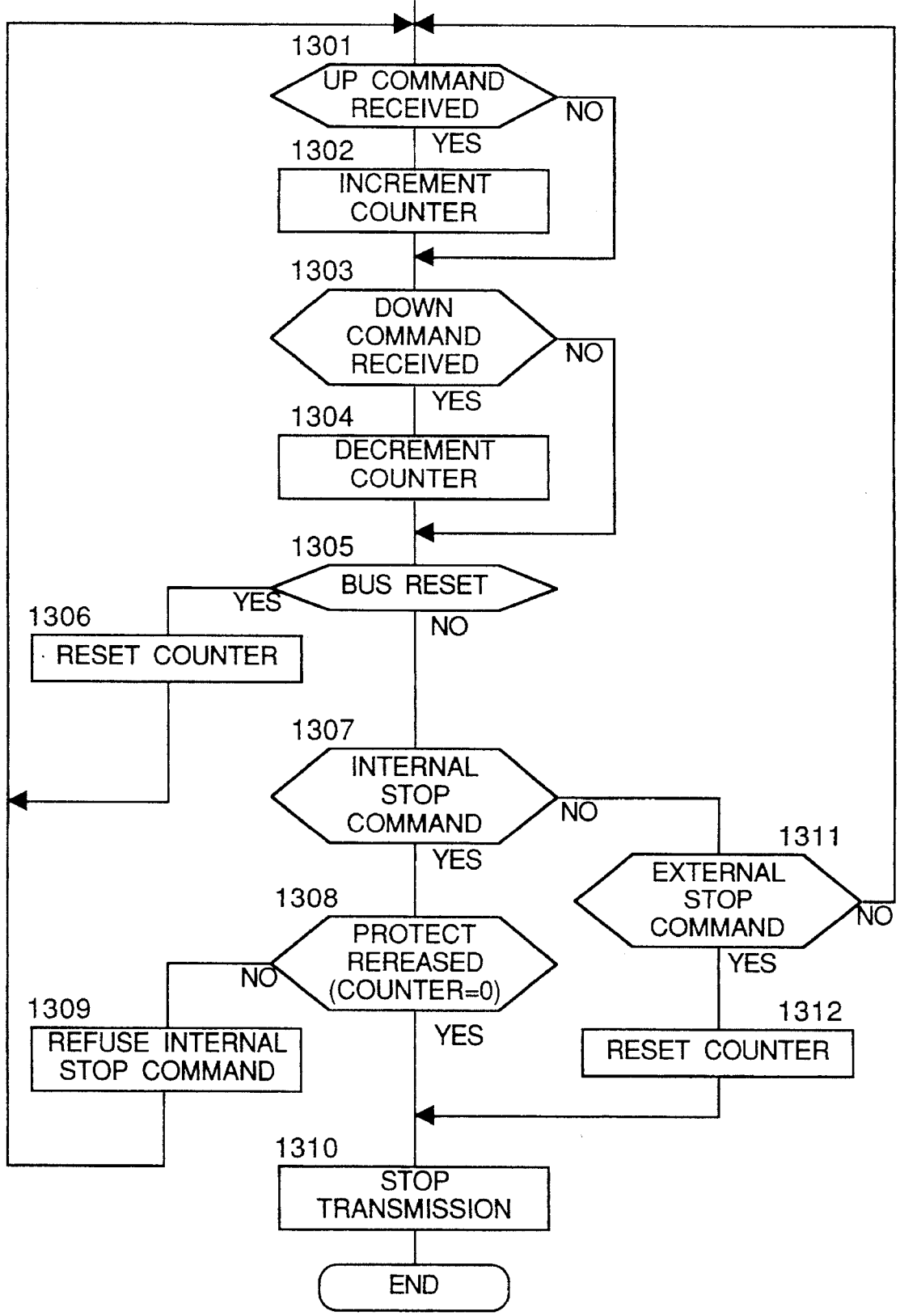
FIG. 9 is a flow chart of the reproduction process of a VCR according to the second embodiment of the present invention.

FIG. 9 is a flow chart of the process executed by the control block 203 in the first play VCR 1201 during the play process whereby the VCR 1201: reproduces the A/V data; requests from the bus manager 1204 the bandwidth required for isochronous transmission; receives permission to transmit; and then actually transmits the isochronous packet. Note, also, that the play VCR 1201, serving as a transmitter node, first writes the assigned node identifier "0" to the node identifier 1101 of the data header 702 according to the isochronous packet format shown in FIG. 7 before commencing isochronous packet transmission.

In the first step 1301, the node attempting to transmit determines whether an up command (a continuation request) has been received from any one of the other nodes. If an up command was received, the protect counter 1201a, which is a 6-bit counter set in memory, is incremented (step 1302); if an up command was not received, control skips to step 1303.

Note that the protect counter 1201a is reset to "0" immediately before isochronous packet transmission begins. As a result, if an up command is received from each of the other two VCRs 1202 and 1203 after the first VCR 1201 begins isochronous packet transmission, the protect counter 1201a in the first VCR 1201 will have a value of "2."

In step 1303, it is determined whether a down command (a stop enable flag) was received from one of the other nodes. If a down command was received, the protect counter 1201a is decremented (step 1304); if not received, control skips to the next step 1305.

If, for example, an up command is received from the other two VCRs 1202 and 1203 and the protect counter 1201a in the transmitting VCR 1201 is "2," the protect counter will not be reset to "0" again until both the other two VCRs 1202 and 1203 produces a down command to the transmitting VCR 1201.

Note, also, that the protect counter is not decremented in step 1304 even if a down command is received if the value of the protect counter is already "0."

In step 1305, it is determined whether a bus reset has been generated; if it has, the protect counter is reset to "0" (step 1306), and control loops back to step 1301. If a bus reset has not been generated; control advances to step 1307.

Isochronous packet transmission is temporarily interrupted when a bus reset occurs, but the transmitting VCR 1201 immediately resumes isochronous packet output after recovering from the bus reset operation.

Bus resets may occur when a connector is connected or disconnected, or when the power supply to one of the bus devices is interrupted. As a result, any node that sent an up command before the bus reset occurred is disabled from sending the down command once a bus reset occurs. In this case, the transmitting VCR 1201 cannot recover from the protected state. It is therefore necessary to reset the protect counter whenever a bus reset occurs.

In step 1307, it is determined whether an asynchronous packet transmission with an internal stop command has been received from any node, e.g., the bus manager node 1204. If it has, it is determined whether the protect counter 1201a is "0" (step 1308).

If the protect counter is any value other than "0" at this time, transmission is protected, the internal stop command is therefore not accepted (step 1309), an internal stop command rejection notice is output to the node 1204 that has sent out the internal stop command, and control loops back to step 1301.

If the protect counter value is "0", transmission is not protected, the internal stop command is accepted, isochronous packet transmission is stopped (step 1310), and processing terminates.

If an asynchronous packet transmission with an internal stop command has not been received in step 1307, it is determined whether an external stop command has been received directly from an external source (step 1311) without communication via the bus. Examples of the external stop commands received directly from an external source include user operation of a STOP SENDING function button provided on the VCR 1201, and pressing a power supply switch turning the power off.

When an external stop command is received in step 1311, the protect counter 1201a is immediately reset to 0 irrespective of the current counter value (step 1312), and isochronous packet transmission is stopped (step 1310). In other words, direct user operation of the device is given priority.

In a transmitting apparatus comprising a digital output button controlling enabling and disabling the output of data to the bus, a direct external stop command may also be generated by the user operating the digital output button during isochronous packet transmission to disable data output.

In a dedicated reproduction device wherein digital signal output stops when reproduction stops because there is no built-in television tuner, a direct external stop command may also be generated by pressing the stop button to stop reproduction and enter the stop mode.

When a direct external stop command is not received in step 1311, control loops back to step 1301 and the entire process is repeated.

Figure 10:
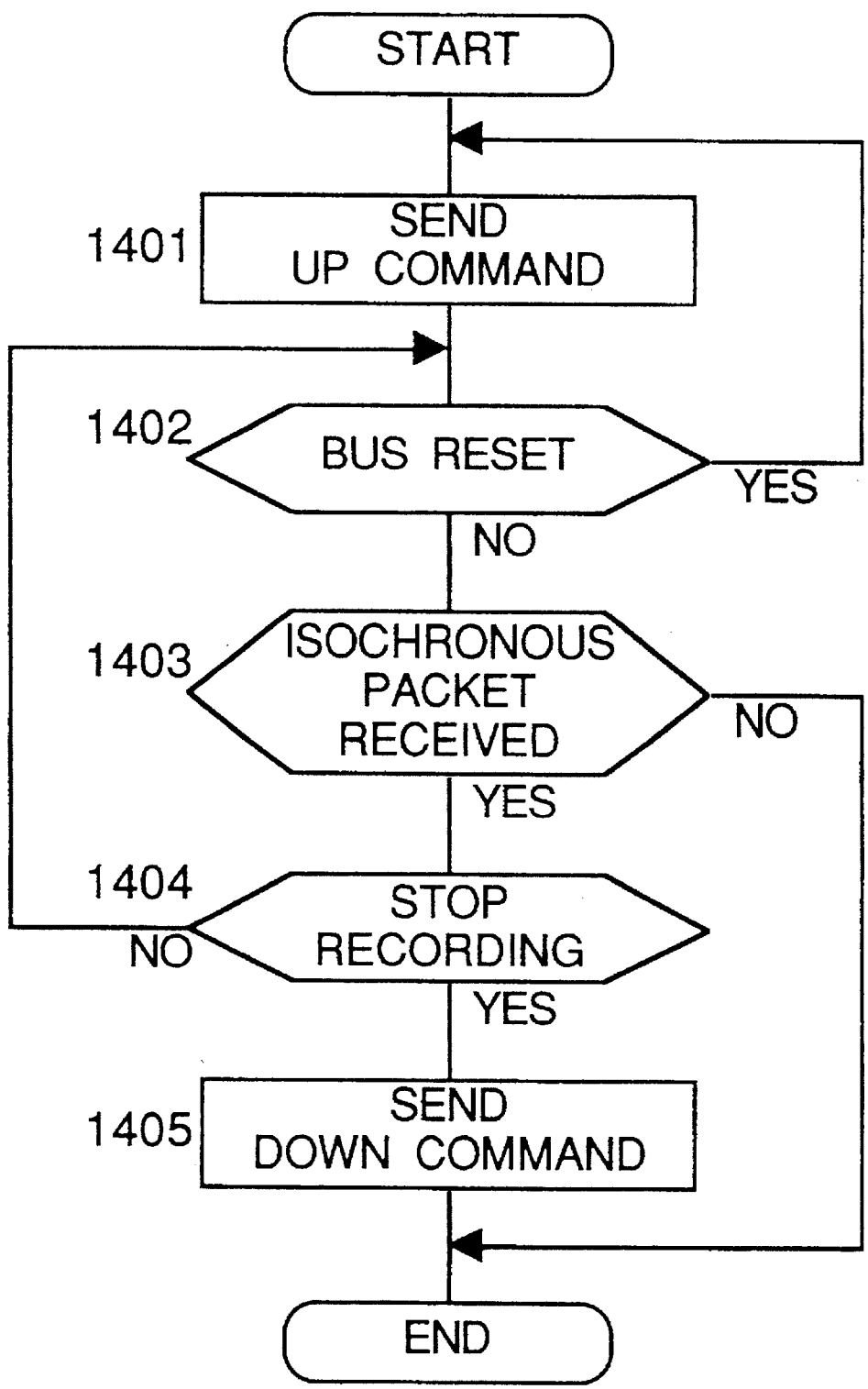
FIG. 10 is a flow chart of the recording process of a VCR according to the second embodiment of the present invention.

FIG. 10 is a flow chart of the process executed by the control block 203 of the receiving VCRs 1202 and 1203 after recording the A/V data isochronous packet actually received from the transmitting VCR 1201 begins.

It is assumed in the description of the present embodiment below that the bus manager node 1204 is accidentally set to the reproduction mode by a user operation during dubbing by the receiving VCRs 1202 and 1203 of the A/V data reproduced by the first VCR 1201. In this case, if the bus manager node 1204 cannot output the isochronous packet, it sends an internal stop command asking the transmitting VCR 1201 to stop outputting the isochronous packets.

Even in such a condition as explained above, according to the first embodiment, the A/V data-recording VCRs 1202 and 1203 continues to correctly dubbing the received A/V data without transmission thereof from the first VCR 1201 being interrupted. In other words, in response to the receipt of the isochronous packet from the transmitting VCR 1201, the recording VCRs 1202 and 1203 send an up command to that VCR 1201 to increment the counter and eventually starting the interruption protect state. In addition, it should be noted that recording VCRs 1202 and 1203 execute the same process in this embodiment, and only the process executed by the one VCR 1202 is described below.

Referring to FIG. 10, the node identifier "0" of the transmitter node 1201, which is written to the data header 702 of the received isochronous packet as described above, is read in step 1401, and an up command is sent to the node identified by that node identifier "0", i.e., to the transmitter node 1201. Control then advances to step 1402.

In step 1402, it is determined whether a bus reset was generated; if it was, control loops back to step 1401 to re-request transmission protection.

If a bus reset did not occur, it is determined whether isochronous packet receiving is normal (step 1403). For example, because the play VCR 1201 is set to the transmission stop state (step 1310), it may be determined whether isochronous packet receiving is interrupted.

When isochronous packet receiving is normal, control advances to the next step 1404, but if receiving is not normal, the process terminates.

In step 1404 it is determined whether a "stop recording" instruction was received; if it was not, control loops back to step 1402, and the loop is repeated to monitor any bus reset instructions until a "stop recording" instruction is received.

When the "stop recording" instruction is received, the node identifier 1101 of the transmitter node 1201 written to the data header 702 of the received isochronous packet as described above is again read, and a down command is sent to the transmitter node identified by that node identifier 1101 in step 1405 to end the process.

As described in the first embodiment above, the transmitter node 1201 writes and transmits the node identifier assigned to itself in the data header 702 of the transmitted isochronous packet, thereby enabling the nodes 1202 and 1203 receiving this isochronous packet to immediately identify the node 1201 that transmitted that packet.

Furthermore, the transmitter node 1201 increments the protect counter at the point an up command is received from, for example, the receiver node 1202 or 1203; decrements the protect counter when a down command is received; and is in a protected state when this protect counter is any value other than "0." When the transmitter node 1201 is protected, it rejects any stop transmission requests received from another node, e.g., from the bus manager node 1204, and continues transmitting. As a result, even when the bus manager node 1204 is accidentally set to the reproduction mode by a user operation during dubbing by the receiving VCRs 1202 and 1203 of the A/V data reproduced by the first VCR 1201, dubbing continues normally without transmission of the isochronous packets from the first VCR 1201 to the A/V data-recording VCRs 1202 and 1203 being interrupted.

In addition, by resetting the protect counter when a bus reset occurs, it is possible even when a bus reset occurs to prevent the transmitter node 1201 from not being able to recover from the protected state, a situation which could otherwise occur because any node that transmitted a continuation request before the bus reset occurred is disabled by the bus reset from issuing the stop enable flag.

It is to be noted that the receiver node sending a up command to the transmitter node in the embodiment described above need not be the node recording the isochronous packets from the transmitter node. For example, a television monitor ("TV" below) and a laser disk player ("LD player" below) could be connected to the bus with the reproduction image from the LD player viewed on the TV. In this case the user could operate control button(s) on the TV, which in this application is the receiver node, to send an up command to the LD player, which in this application is the transmitter node, to maintain reproduction image transmission from the LD player to the TV and prevent reproduction images from some other device connected to the same bus from being accidentally displayed on the TV.

Also in the above embodiment the transmitter node is set to a protected state when an up command is received thereby from a receiver node, but it is to be noted that this protected state can also be set by inputting a "continue transmission" instruction directly from an external device rather than through the bus system. For example, in the above TV and LD player example, a PROTECT function button could be provided on the LD player (transmitter node) for setting the LD player to the protected state by simply operating this PROTECT button.

In addition, a counter provided in memory is used as the means for determining whether the transmitter node is in the protected or protection-cancelled state, but any other means of determining whether the transmitter node is in the protected or protection-cancelled state may be alternatively used. For example, it is alternatively possible to use a register having only as many bits as the number of connectable nodes.

By the data transmission method of the present invention as described above, when transmitting A/V data requiring real-time processing by isochronous packets using a bus system whereby a node identifier is automatically assigned to each node connected to the bus whenever a bus reset occurs, it is also possible by adding the node identifier of the transmitter node to the isochronous packets before transmission for the receiver node to immediately determine which node transmitted the received isochronous packets; this can be accomplished by simply reading the transmitter node identifier included in the received isochronous packets.

Furthermore, by identifying the transmitter node, the receiver node can as required send to the transmitter node an up command requesting sustained transmission of the isochronous packets; and send a down command requesting cancellation of the up command when it is no longer necessary to continue the transmission. The node transmitting said isochronous packets is thus set to a protected state when one or more up commands is received, and cancels the protected state when the number of down commands received by the transmitter node exceeds the number of received up commands.

When the transmitter node is in the protected state, internal stop commands received from any node are rejected, and isochronous packet transmission does not stop (is continued). As a result, interruption of isochronous transmission due to accidental or mistaken operation by the user can be prevented.

More specifically, it is possible to prevent isochronous packet transmission between any given nodes from being interrupted as a result of misoperation of any node not directly associated with that isochronous packet transmission operation. This is particularly effective during dubbing and other isochronous transmission operations during which communication may be sustained for a relatively long period of time.

In addition, by automatically resetting any protected-state transmitter node to the protection-cancelled state whenever a bus reset occurs, it is possible even when a bus reset occurs to prevent the transmitter node from not being able to recover from the protected state, a situation which could otherwise occur because any node that transmitted an up command before the bus reset occurred is disabled by the bus reset from issuing the down command.

The second embodiment of a data transmission method according to the present invention is described below.

In conventional data transmission methods for isochronous transmission using the IEEE P1394 protocol, the transmitter node selects an unused channel number in the range from 0–63, inclusive, and adds the selected channel number to the packet header in the isochronous packet before transmission. The transmitter node must also simultaneously inform the user of the channel number used for transmission. Because there may be plural isochronous packets transmitted on different channels, the user must therefore inform the receiver node of the channel number of the isochronous packets to be received. Isochronous packet transmissions by the method of the prior art thus requires user intervention to match the channel number used by the transmitting and receiver nodes, significantly increasing the user burden.

The object of the second embodiment of the present invention is to enable packet transmission using a Broadcast channel, i.e., a preselected channel with a predetermined channel number N (N is an integer between 0 and 63 inclusive), unless the transmitter node specifies the use of a different channel number. The Broadcast channel is also called a default channel.

Figure 11:
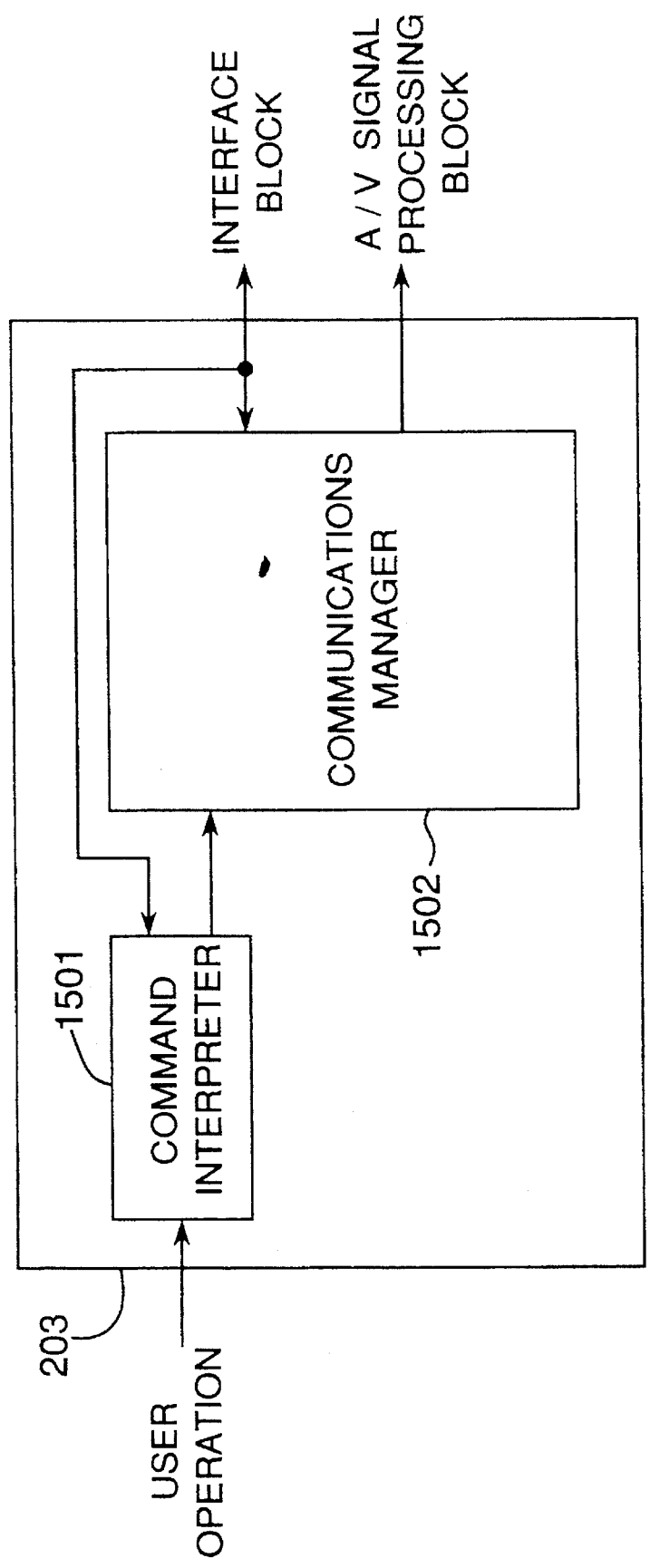
FIG. 11 is a block diagram of the control block in the second, third and fourth embodiments of the present invention.

A block diagram of the control block 203 used in this embodiment is shown in FIG. 11. The command interpreter 1501 interprets operating commands received as a result of direct user control or asynchronous transmission from another node, and instructs the communications manager 1502 to begin and end isochronous and asynchronous transmission.

The input to the communications manager 1502 includes instructions from the command interpreter 1501, and information input by asynchronous transmission from other nodes and required for communications management. Based on the input information, the communications manager 1502 instructs the interface block 201 and the A/V signal processing block 202 when to begin and end isochronous transmission; outputs the information required for communications management of the other nodes to the interface block 201 as asynchronous data; and simultaneously instructs the interface block 201 to output that information by asynchronous transmission.

The procedure whereby the transmitter node begins isochronous packet transmission by the data transmission method according to this second embodiment is described next.

The user first instructs the A/V device that is the transmitter node to output the A/V data by the user operation. This instruction is input to the command interpreter 1501 of the control block 203; the information instructing output of the real-time data on the Broadcast channel is extracted by the command interpreter 1501 from the input instruction; and the extracted information is input to the communications manager 1502. The communications manager 1502 then executes control to begin outputting the real-time data using the Broadcast channel.

Figure 12:
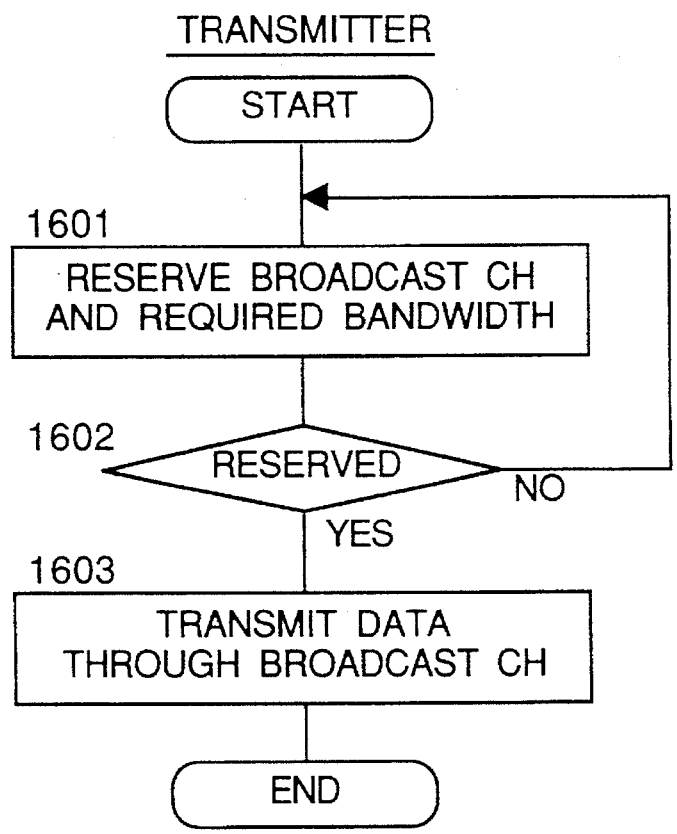
FIG. 12 is a flow chart of the communications management block when transmission is started by the second embodiment of the invention.

FIG. 12 is a flow chart of the operation of the communications manager block in the transmitter node. The communications manager 1502 executes step 1601 when real-time data output using the Broadcast channel is instructed by the command interpreter 1501. At step 1601, the communications manager 1502 instructs the interface block 201 to obtain or reserve from the bus manager the Broadcast channel and the usable bandwidth thereof. Based on this instruction, the interface block 201 negotiates with the bus manager 1204 using asynchronous transmission to obtain an acceptance for the reservation of the necessary bandwidth and the Broadcast channel. The interface block 201 then notifies the communications manager 1502 in the control block 203 whether the Broadcast channel and the requested bandwidth were obtained.

After executing step 1601, the communications manager 1502 advances to step 1602 to determine from the information input from the interface block 201 whether the Broadcast channel and the requested bandwidth were reserved. If the reservations were accepted by the bus manager 1204, control advances to step 1603; if not, control loops back before step 1601 and the communications manager 1502 re-attempts to reserve the Broadcast channel and the requested bandwidth.

In step 1603, the communications manager 1502 instructs the A/V signal processing block 202 to output to the interface block 201 the A/V data and other real-time data. The A/V signal processing block 202 then outputs this real-time data to the interface block 201. The communications manager 1502 also instructs the interface block 201 to output the real-time data input from the A/V signal processing block 202 by isochronous packets using the Broadcast channel. The interface block 201 thus outputs the isochronous packets as instructed by the communications manager 1502.

The procedure whereby the receiver node begins receiving isochronous packets by the data transmission method according to this third embodiment is described next.

The user first instructs the A/V device that is the receiver node to receive the A/V data. This instruction is input to the command interpreter 1501 of the control block 203, the information instructing input of the real-time data on the Broadcast channel is extracted by the command interpreter 1501 from the input instruction, and the extracted information is input to the communications manager 1502. The communications manager 1502 then executes controls for receiving the real-time data using the Broadcast channel.

Figure 13:
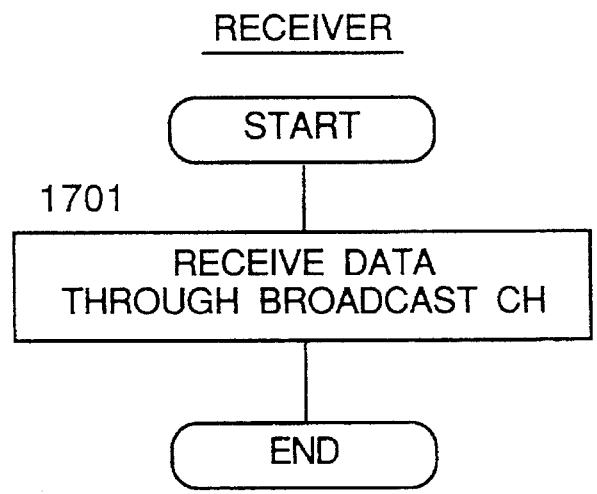
FIG. 13 is a flow chart of the communications management block when receiving is started by the second embodiment of the invention.

FIG. 13 is a flow chart of the operation of the communications manager block in the receiver node. The communications manager 1502 executes step 1701 when real-time data receiving using the Broadcast channel is instructed by the command interpreter 1501. At step 1701, the communications manager 1502 instructs the interface block 201 to receive the isochronous packets on the Broadcast channel.

Based on this instruction, the interface block 201 receives the isochronous packets to which the Broadcast channel has been assigned, and outputs the real-time data to the A/V signal processing block 202. Also in step 1701, the communications manager 1502 instructs the A/V signal processing block 202 to receive the real-time data from the interface block 201 and execute the appropriate signal processing. The A/V signal processing block 202 therefore receives the realtime data from the interface block 201 and executes signal processing as instructed by the communications manager 1502.

It is therefore possible by the second embodiment of a data transmission method according to the present invention to accomplish isochronous transmission with the user simply instructing the transmitter node and receiver node(s) to output and input, respectively. It is therefore not necessary for the user to inform the receiver node of the channel number used, and a more user-friendly system reducing the burden on the user can be achieved.

The third embodiment of a data transmission method according to the present invention relates to the isochronous transmission start and stop procedures executed by nodes A and B when node A is transmitting by isochronous transmission and node B is then substituted for node A to continue transmission by isochronous transmission, such as when editing two tapes into one tape.

The following procedure is typically executed to change the transmitter node in data transmission methods according to the prior art. To stop transmission by node A during isochronous transmission by node A, the user operates node A to stop transmission. When node A thus receives a "stop transmission" instruction from the user, node A stops outputting isochronous packets, and releases the channel number and used bandwidth to the bus manager. The user then instructs node B acquire a channel and to commence output using the acquired channel. In this case, node B must communicate with the bus manager to obtain an acceptance from the bus manager to use a new channel and a bandwidth before starting the isochronous transmission, which is the follow-up of the node A's isochronous transmission. As described above, it is necessary for the user to separately operate both nodes A and B. In addition, both node A and node B must separately communicate asynchronously with the bus manager, thus increasing bus traffic.

Figure 14:
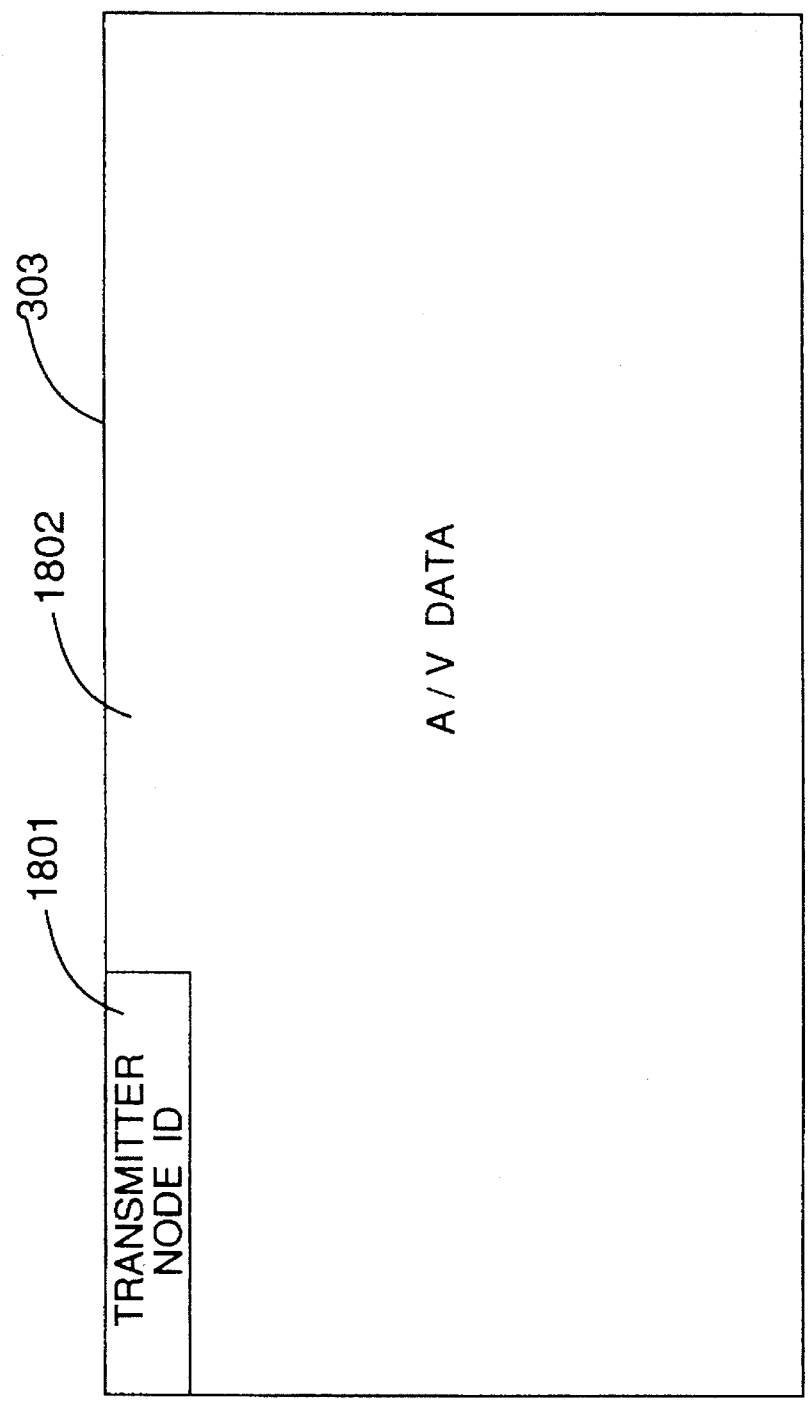
FIG. 14 shows the format of the data block in the isochronous packet according to the third and third embodiments of the present invention.

The data transmission method of the third embodiment of the present invention resolves this problem as follows. When node A, such as play device 1201 in FIG. 8, is transmitting by isochronous transmission using the Broadcast channel described above, the present embodiment controls node B, such as play device 1205 in FIG. 8, to begin isochronous packet transmission using the Broadcast channel in place of node A. According to the third embodiment, the node identifier of the transmitter node is written to each isochronous packet before the packet is output, so that the node transmitting the isochronous packets can be determined by simply receiving the isochronous packets. One example of the data format in the data block 303 of the isochronous packets according to this embodiment is shown in FIG. 14.

The transmitter node identifier 1801, which is simply the node identifier of the transmitter node, is added to the data block 303. In this example the real-time data 1802 is added after the transmitter node identifier 1801. It is also possible to place a data header 702 at the beginning of the data block 303 as shown in FIG. 7, and write the node identifier 1101 to that data header. The real-time data 1802 is input from or is output to the A/V signal processing block 202.

The procedure whereby node B begins isochronous transmission according to this embodiment is described below.

Figure 15:
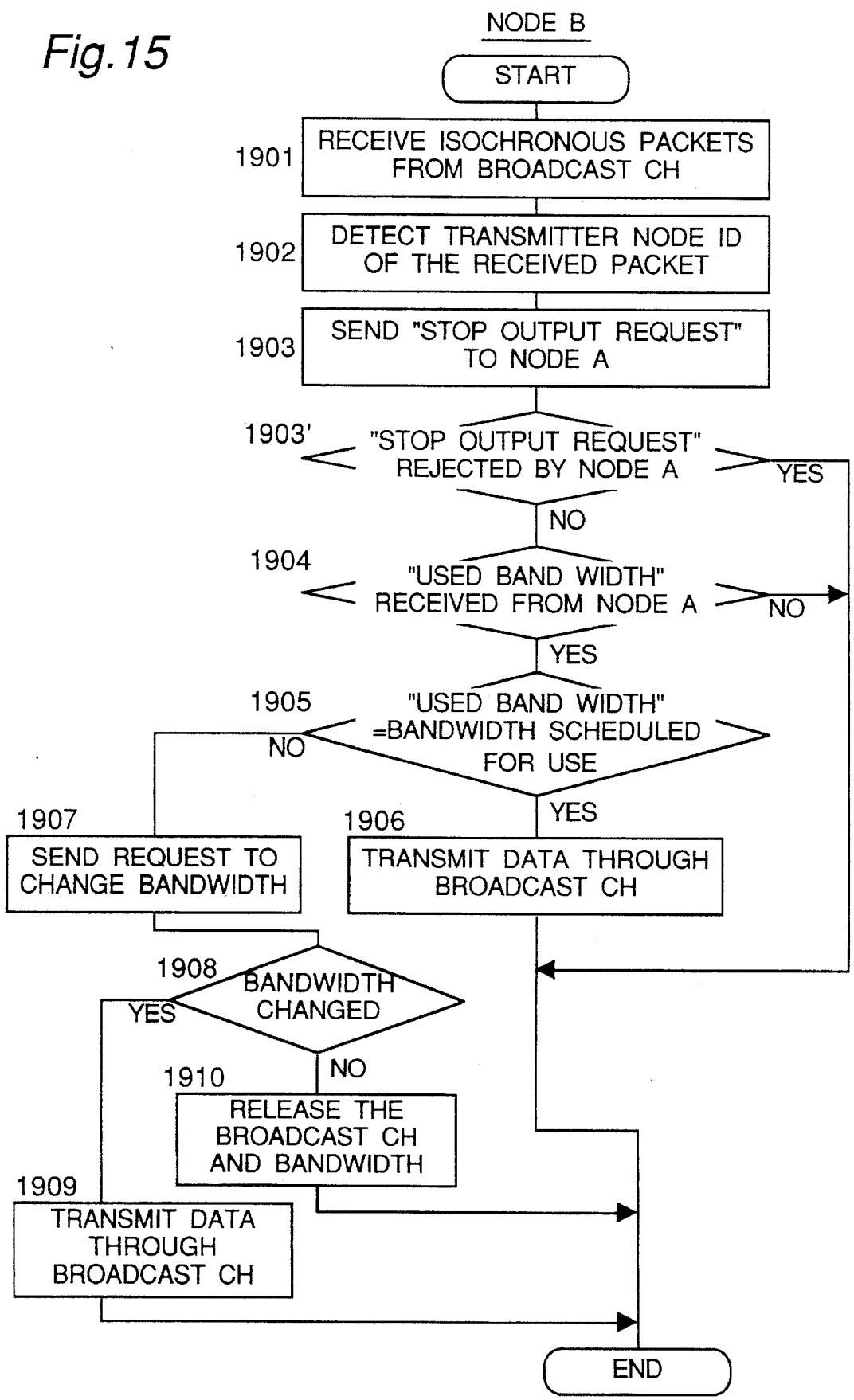
FIG. 15 is a flow chart of the communications management block when transmission is started by the third embodiment of the invention.

FIG. 15 is a flow chart of the operation of the communications manager 1502 in the control block 203 of node B. When the user instructs node B to begin isochronous transmission by operating either node B or another node, the user command is relayed to the communications manager 1502 via the command interpreter 1501 in the control block 203 of node B. When the communications manager 1502 receives the user command, it instructs the interface block 201 to receive isochronous packets from the Broadcast channel (step 1901). When the interface block 201 receives an isochronous packet of the Broadcast channel, it detects the transmitter node identifier 1801 added to the received packet, and reports the detected node identifier to the communications manager 1502 in the control block 203 (step 1902).

Further more, in step 1902, the node identifier of the node transmitting the isochronous packets on the Broadcast channel is input from the interface block 201, node B recognizes that isochronous packets have been transmitted from node A through the Broadcast channel, and control advances to step 1903.

In step 1903, the interface block 201 is instructed by the communications manager 1502 to send a "stop output request" to node A, and the interface block 201 therefore sends a "stop output request" to node A using asynchronous packet transmission. In step 1903, it is detected whether or not the node A has rejected the "stop output request". When output from node A is not completed, node B is notified that node A has rejected the "stop output request" (step 2005). If it has, the control ends, but if not, the control advances to step 1904.

In step 1904, it is determined whether a "used bandwidth" used by node A was received, or not. When node A stops output, node B is notified of the bandwidth used by node A after transmission stops (step 2004).

When the interface block 201 of node B receives an asynchronous packet containing either the "used bandwidth" of node A or rejection notice of the "stop output request", it informs the communications manager 1502 of the received information. When the communications manager 1502 of node B is informed by the interface block 201 of the used bandwidth, control advances to step 1905.

In step 1905, it is determined whether the used bandwidth of node A and the bandwidth scheduled for use by node B are equal. If they are, control advances to step 1906.

In step 1906, the A/V signal processing block 202 and interface block 201 are controlled to output the real-time data by Broadcast channel isochronous packets. The A/V signal processing block 202 thus outputs the real-time data to the interface block 201, and the interface block 201 outputs the isochronous packets, as instructed by the communications manager 1502.

If in step 1905 the used bandwidth of node A and the bandwidth scheduled for use by node B are determined to not be equal, the communications manager 1502 branches to step 1907 and instructs the interface block 201 to request the bus manager to change the bandwidth. The interface block 201 thus negotiates with the bus manager 1204 using asynchronous transmission to change the used bandwidth, and informs the communications manager 1502 whether the used bandwidth was successfully changed.

At step 1908, the communications manager 1502 determines whether the used bandwidth was successfully changed; if it was not, the interface block 201 is instructed to release to the bus manager the Broadcast channel and the bandwidth used by node A (step 1910). If the used bandwidth was successfully changed (step 1908), the A/V signal processing block 202 and interface block 201 are instructed to output the real-time data using isochronous packets assigned the Broadcast channel (step 1909). Following the instructions from the communications manager 1502, the A/V signal processing block 202 outputs the real-time data to the interface block 201, which then outputs the isochronous packets as also instructed by the communications manager 1502.

Figure 16:
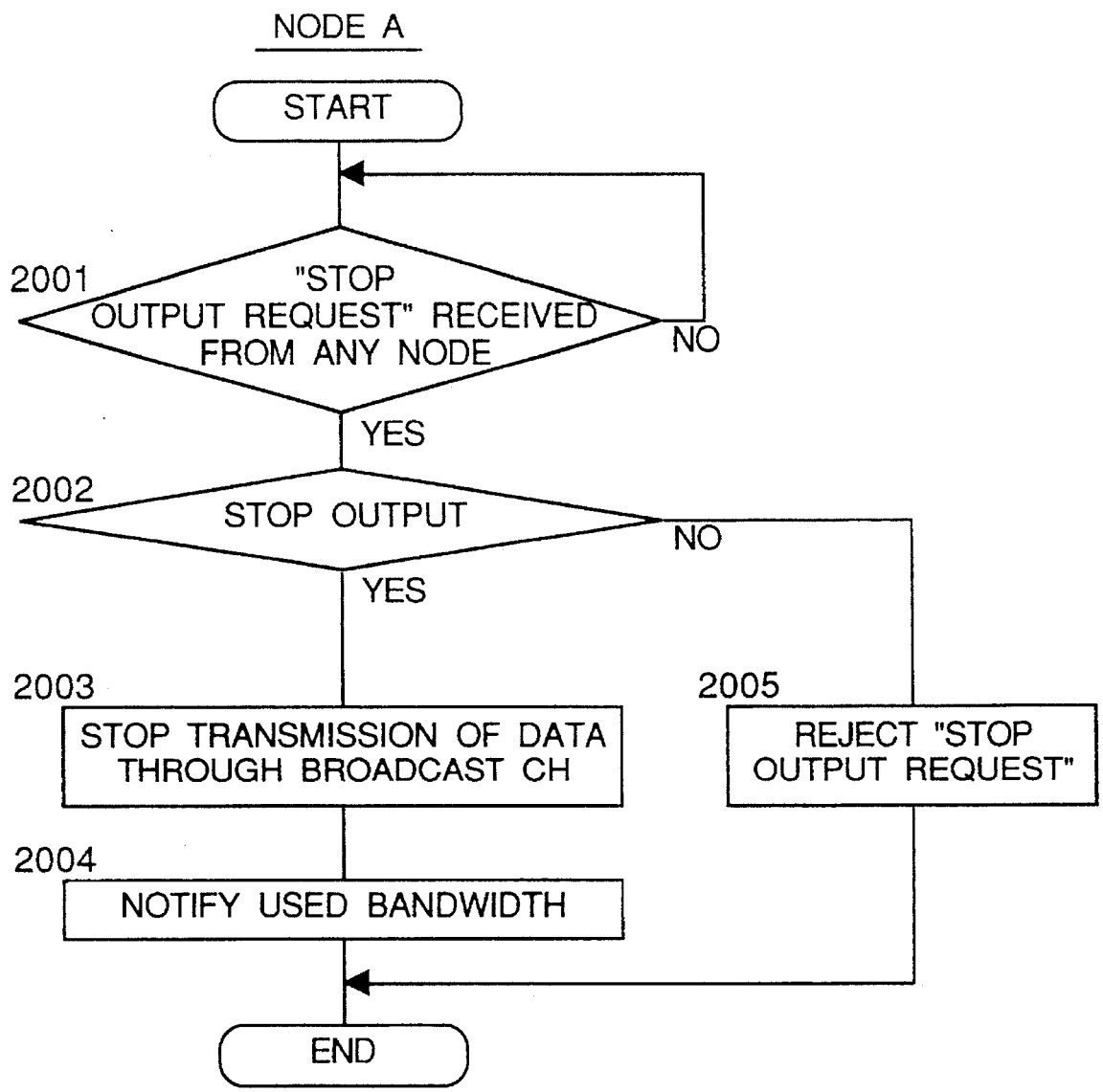
FIG. 16 is a flow chart of the communications management block when transmission is stopped by the third embodiment of the invention.

The procedure in node A for stopping the isochronous transmission is described next. FIG. 16 is a flow chart of the operation of the communications manager 1502 in the control block 203 of node A. When node A is transmitting via isochronous transmission, the communications manager 1502 in the control block 203 of node A monitors whether a stop output request has been received from another node (step 2001), such as from node B. When the node A interface block 201 receives from another node (node B in this example) via asynchronous transmission an asynchronous packet containing a stop output request, it notifies the communications manager 1502 that a stop output request was received from node B.

When the communications manager 1502 thus determines in step 2001 that a "stop output request" was received, it determines in step 2002 whether output can be stopped. This determination can be entrusted to the user, but it is also normally possible to make this determination by determining whether there is any device inputting the A/V data being output by node A. To enable this, it is necessary for any nodes inputting A/V data from any other node to request the node outputting that A/V data to not stop A/V data output. If it is determined in step 2002 that output cannot be stopped, the communications manager 1502 instructs the interface block 201 to notify node B that the stop output request is rejected (step 2005), and the interface block 201 so notifies node B by asynchronous transmission. Node A therefore does not stop outputting.

If, however, it is determined in step 2002 that output can be stopped, the interface block 201 and A/V signal processing block 202 are instructed to end the isochronous transmission. The interface block 201 therefore stops isochronous packet output as instructed by the communications manager 1502, and the A/V signal processing block 202 stops outputting the real-time data to the interface block 201 as likewise instructed (step 2003).

The communications manager 1502 then instructs the interface block 201 to notify node B of the bandwidth used by node A (step 2004), and the interface block 201 so notifies node B by asynchronous transmission.

It is therefore possible by the present embodiment to switch the transmitter node from one node (A) to another node (B) by the user operating only node B, and when the bandwidth used by nodes A and B is the same, it is not necessary for nodes A and B to communicate with the bus manager, thereby reducing bus traffic.

A data transmission method according to the fourth embodiment of the present invention is described below. The fourth embodiment of a data transmission method according to the present invention relates to a means for switching the isochronous transmitter node from node A to node B. When isochronous transmission is continued with node B substituted for node A, it is necessary by the method of the third embodiment above for node B to send a "stop output request" to node A. If it is determined that node A is unable to stop output, node A rejects the stop output request from node B and maintains data output.

By the third embodiment of the invention, it is possible for the user to force node A to stop data output and instruct node B to begin output when it is necessary for the user to force the transmitter node to switch from node A to node B. When node A thus receives a stop output command from the user, node A must release the Broadcast channel and used bandwidth by asynchronous transmission with the bus manager. It is also necessary for node B to obtain from the bus manager by asynchronous transmission the Broadcast channel and the bandwidth to be used by node B as commanded by the user.

As a result, when node A sends a stop output rejection notice to node B, the user must operate both node A and node B, and both node A and node B must communicate with the bus manager by asynchronous transmission.

The fourth embodiment of the invention is described below, referring first to the procedure whereby node B starts isochronous transmission.

Figure 17:
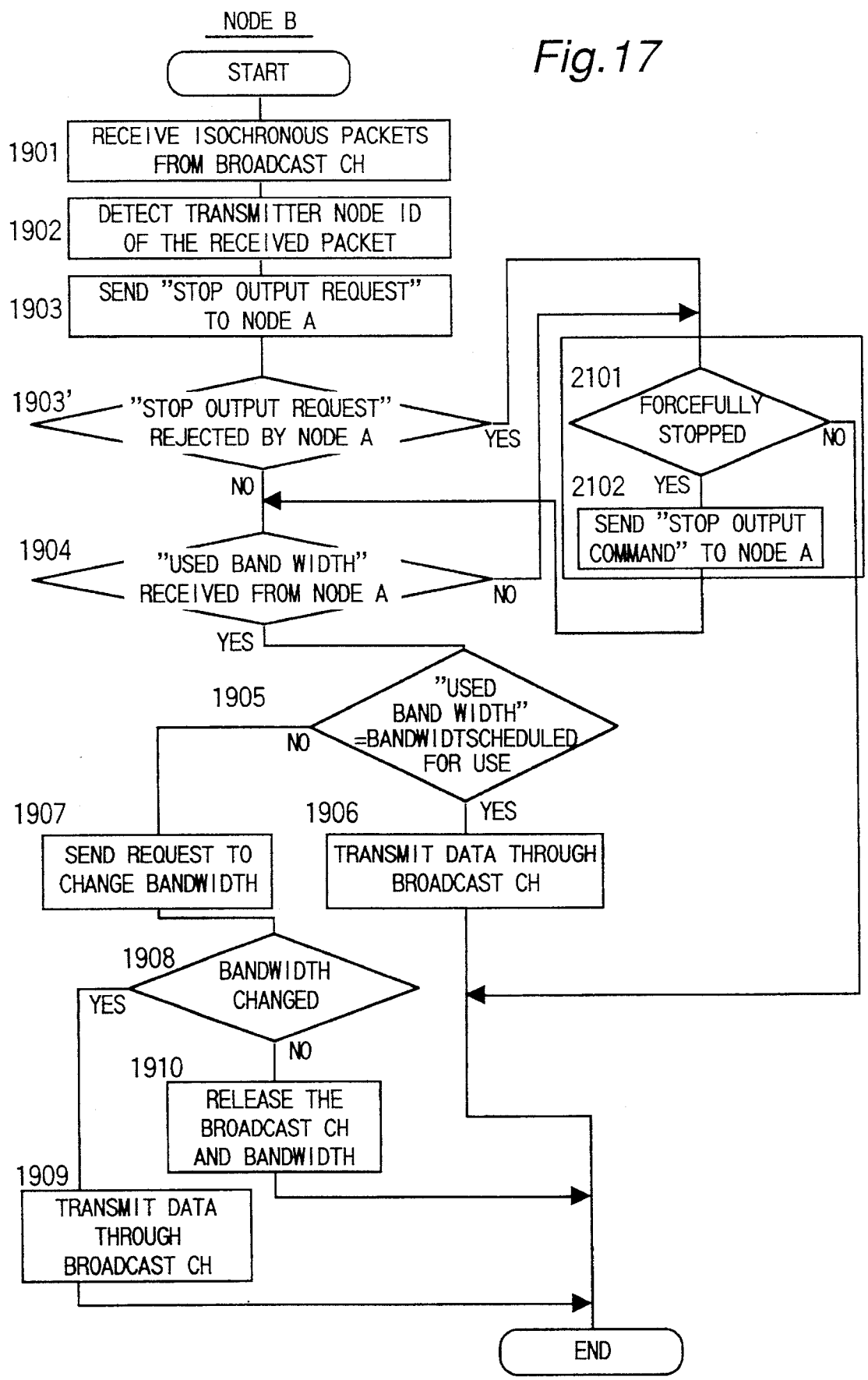
FIG. 17 is a flow chart of the communications management block when transmission is started by the fourth embodiment of the invention.

FIG. 17 is a flow chart of the operation of the communications manager 1502 in the control block 203 of node B. This flow chart differs from that of the third embodiment shown in FIG. 15 in that steps 2101 and 2102 are further added, which are for the operation taken when a stop request rejection is received from node A in step 1904. When a stop request rejection is received by node B, or when the "used bandwidth" is not received by node B, it is determined whether output from node A should be forcefully stopped in step 2101. This determination is made by the user, and is communicated to the communications manager 1502 via the command interpreter 1501. If it is not determined to forcefully stop node A output in step 2101, output by node B using the Broadcast channel does not occur.

When it is determined in step 2101 to forcefully stop node A output, the communications manager 1502 instructs the interface block 201 to send a "stop output command" to node A (step 2102). Note that the stop output command must be output within a predetermined period after the stop output rejection is received. When node A receives the stop output command, it stops output, and notifies node B of the bandwidth used for node A output. The interface block 201 of node B then receives an asynchronous packet containing the used bandwidth from node A, and forwards this information to the communications manager 1502 of node B. After executing step 2102, the node B communications manager 1502 loops back to step 1904, from which control flows to step 1905 because the used bandwidth has been received from node A; operation thereafter is the same as described above for the third embodiment.

Figure 18:
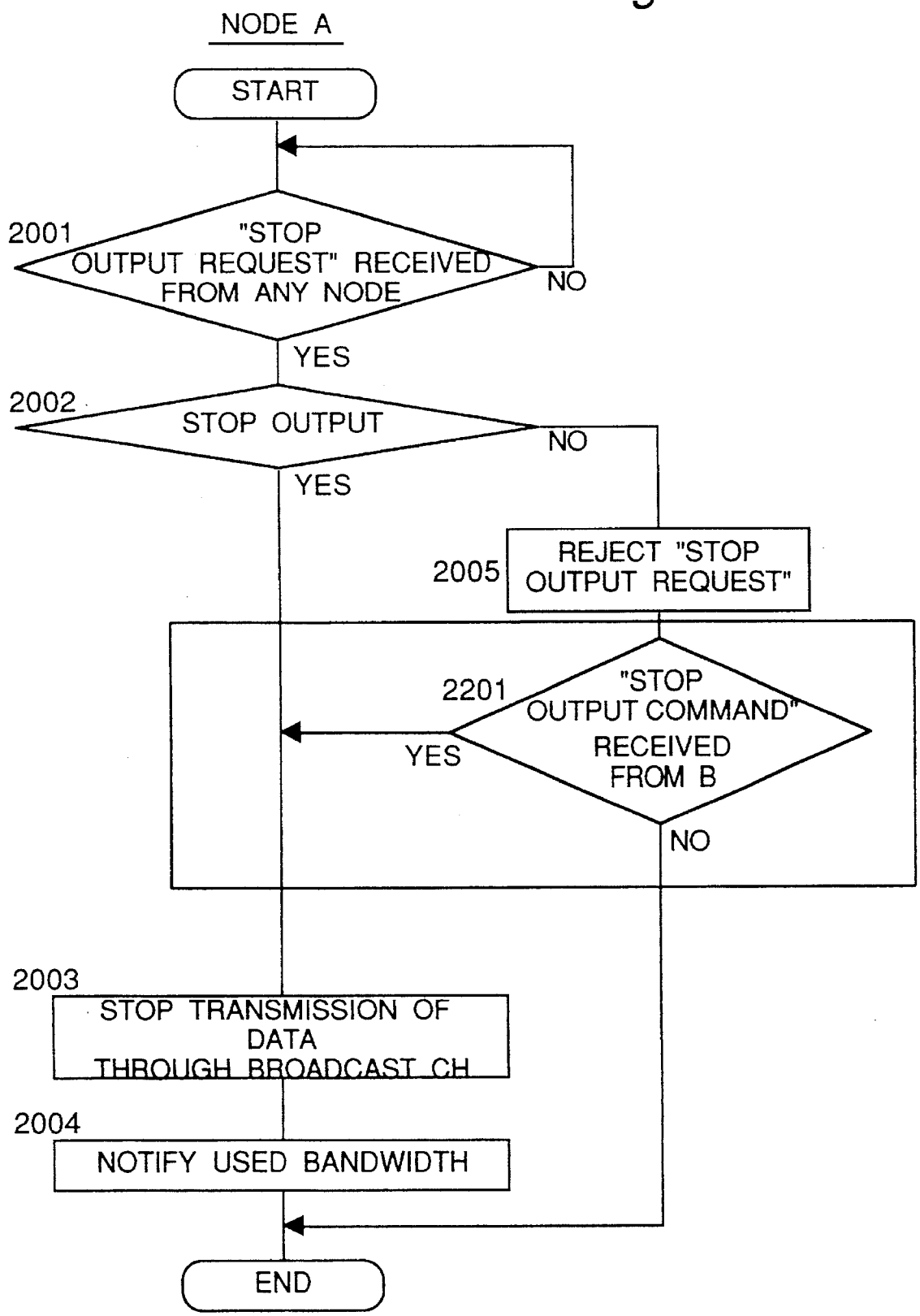
FIG. 18 is a flow chart of the communications management block when transmission is stopped by the fourth embodiment of the invention.

The procedure in node A for stopping the isochronous transmission in this fourth embodiment is described next. FIG. 18 is a flow chart of the operation of the communications manager 1502 in the control block 203 of node A. This flow chart differs from that of the third embodiment described above (FIG. 16) in that step 2201 is further added, that is the operation taken after node B is notified in step 2005 that the stop output request was rejected.

In step 2005, the communications manager 1502 of node A instructs the interface block 201 to notify node B that the stop output request is rejected (step 2005), and the interface block 201 so notifies node B by asynchronous transmission. The communications manager 1502 then monitors for a predetermined period of time in step 2201 whether a stop output command is received from node B. If node B receives a stop output rejection from node A, and determines that node A output should be forcefully stopped, node B outputs the stop output command to node A within the predetermined period of time after receiving the stop output rejection. The node A interface block 201 thus receives from node B an asynchronous packet containing the stop output command, and notifies the communications manager 1502 thereof that a stop output command was received from node B.

The communications manager 1502 thus determines in step 2201 that a "stop output command" was received, and control advances to step 2003; operation thereafter is the same as described above for the third embodiment.

When node B determines that node A output should not be forcefully stopped, the stop output command is not output within the predetermined period of time after the stop output rejection is received, the communications manager 1502 determines in step 2201 that the stop output command was therefore not received, and node A isochronous transmission continues.

By the fourth embodiment of the invention thus described, the user is able to stop output from node A by operating only node B and not operating node A when changing the isochronous transmission node from node A to node B, even when node A rejects the stop output request from node B.

The fifth embodiment of the present invention is described below. The fifth embodiment relates to a method whereby: node A, such as a central control device, notifies node B, such as a play device, of the channel number to be used, and instructs node B to execute isochronous transmission using the assigned channel number; and node A notifies node C, such as a monitor device, of the channel number to be used, and instruct node C to receive isochronous packets using the assigned channel number from node B.

If this embodiment was not employed, there will be a bus traffic increase, as explained. When node A notifies node B of the channel number to be used between nodes B and C, and instructs node B to execute isochronous transmission between nodes B and C, node B negotiates with the bus manager via asynchronous transmission to obtain the specified channel number and the bandwidth to use. When node B successfully obtains the bandwidth and channel number, node B begins output immediately. If, for example, node B is unable to obtain the channel number specified by node A, a change of channel number must be requested from node A, and bus traffic due to communications between nodes A and B increases.

The procedure in node A for specifying the channel number and issues an output command to node B according to this embodiment of the invention is described below. Node A issues an output command to node B in response to user operation of node A. The user command is passed through the command interpreter 1501 to the communications manager 1502.

Figure 19:
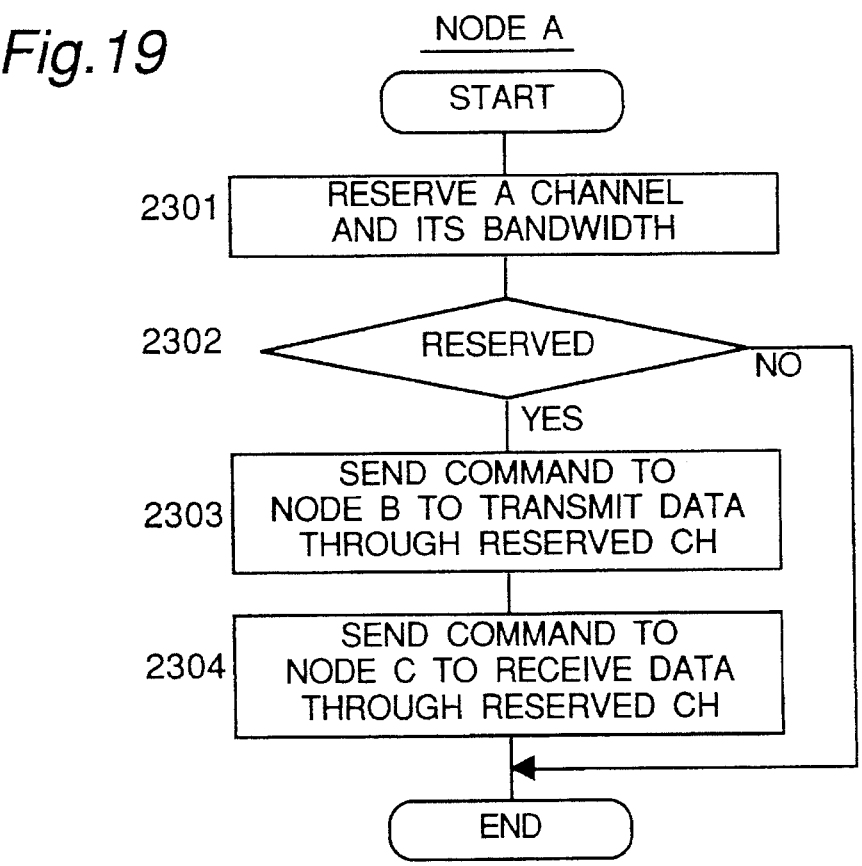
FIG. 19 is a flow chart of the communications management block when isochronous transmission to another node is commanded by the fifth embodiment of the invention.

FIG. 19 is a flow chart of the operation of the communications manager 1502 of node A when node A specifies the channel number to be used between nodes B and C.

The communications manager 1502 in step 2301 instructs the interface block 201 to reserve a channel number other than the Broadcast channel and its bandwidth. More specifically, the interface block 201 communicates asynchronously with the bus manager as instructed by the communications manager 1502 to reserve one open channel number other than the Broadcast channel and the bandwidth to use, and reports the reserved channel number and bandwidth to the communications manager 1502.

The communications manager 1502 then determines in step 2302 whether the channel number and bandwidth were successfully reserved; if they were obtained, control advances to step 2303.

The communications manager 1502 then outputs an output command to the interface block 201 causing node B to begin transmitting data through the reserved channel number (step 2303). The interface block 201 thus sends the output command and channel number to use to node B via asynchronous transmission as instructed by the communications manager 1502.

Similarly, the communications manager 1502 then outputs an receiving command to the interface block 201 causing node C to begin receiving data through the reserved channel number (step 2304). The interface block 201 thus sends the receiving command and channel number to use to node C via asynchronous transmission as instructed by the communications manager 1502.

The procedure in node B for transmitting data through the reserved channel number specified by node A under isochronous transmission is described next.

The node B interface block 201 receives an asynchronous packet containing the output command and the channel number to be used between nodes B and C. The presence of the output command and the channel number to be used are then relayed to the communications manager 1502 of node B.

Figure 20:
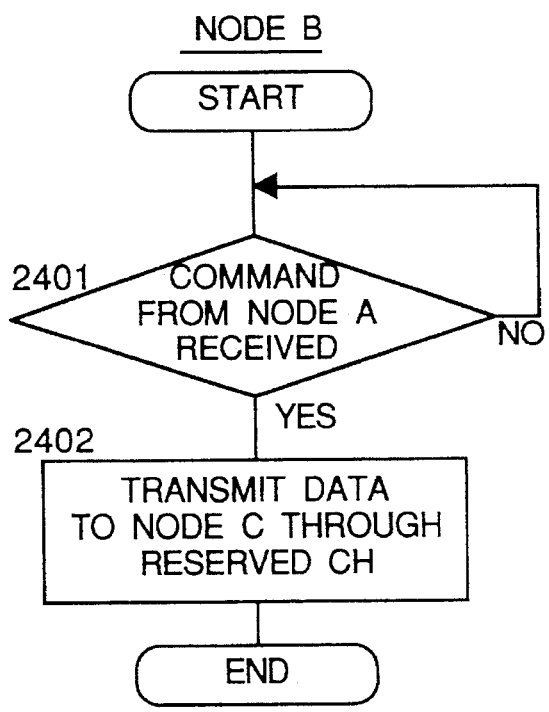
FIGS. 20 and 21 are flow charts of the communications management block when isochronous transmission is commanded by another node according to the fifth embodiment of the invention.

FIG. 20 is a flow chart of the operation of the node B communications manager 1502 during this operation.

The communications manager 1502 detects the output command from node A in step 2401, and passes control to step 2402 when the output command is detected.

In step 2402, the communications manager 1502 instructs the A/V signal processing block 202 to output the real-time data to the interface block 201. The communications manager 1502 then instructs the interface block 201 to execute isochronous transmission from node B to Node C using the reserved channel number specified by node A. The A/V signal processing block 202 therefore outputs the real-time data to the interface block 201, which thus transmits the real-time data input from the A/V signal processing block 202 using isochronous packets assigned to the channel number specified by node A, according to the instructions from the communications manager 1502.

The procedure in node C for receiving data through the reserved channel number specified by node A under isochronous transmission is described next.

The node C interface block 201 receives an asynchronous packet containing the receiving command and the channel number to be used between nodes B and C. The presence of the receiving command and the channel number to be used are then relayed to the communications manager 1502 of node C.

Figure 21:
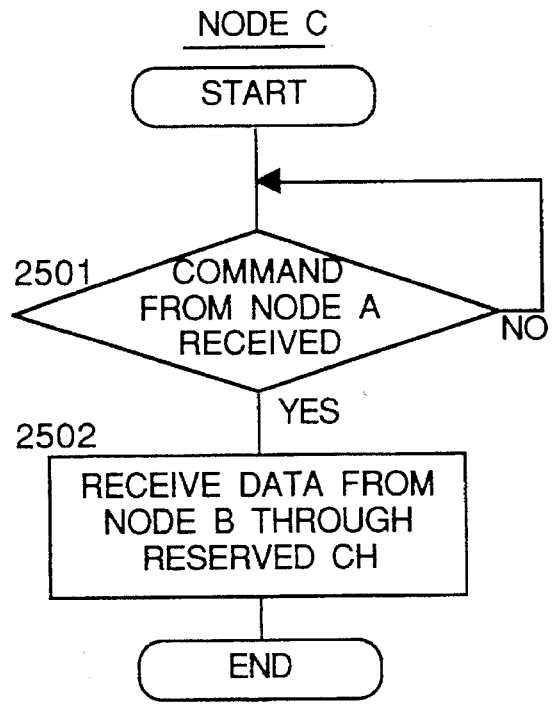

FIG. 21 is a flow chart of the operation of the node C communications manager 1502 during this operation.

The communications manager 1502 detects the receiving command from node A in step 2501, and passes control to step 2502 when the receiving command is detected.

In step 2502, the communications manager 1502 instructs the A/V signal processing block 202 to receive the real-time data to the interface block 201. The communications manager 1502 then instructs the interface block 201 to execute isochronous transmission from node B to Node C using the reserved channel number specified by node A. The A/V signal processing block 202 therefore receives the real-time data from the interface block 201.

By this embodiment thus described, the node outputting the output command and receiving command (node A in the present embodiment) reserves the bandwidth and the channel number to be used between nodes B and C. As a result, when the channel number and bandwidth cannot be reserved, asynchronous transmission between nodes A and B does not occur.

Furthermore, when the channel number is specified for another node according to the present embodiment, the reserved channel number will not be the Broadcast channel. As a result, nodes other than nodes A, B and C can execute isochronous transmission using the Broadcast channel as described in the second embodiment of the invention above.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A data transmission method for transmitting data over a bus requiring real-time processing of isochronous packets, at least one of a transmitting node and a receiving node comprising a plurality of nodes, the data being transmitted from the transmitter node to the receiver node, the data transmission method comprising the steps of:

assigning a node identifier to each node of the plurality of nodes that are connected to the bus when a bus reset occurs;

adding the node identifier of the transmitter node transmitting isochronous packets to the transmitted isochronous packets;

detecting the node identifier added to the isochronous packet received at the receiver node;

generating a continue command, at the receiver node, to continue a predetermined operation of the receiver node;

generating a release command, at the receiver node, to release the predetermined operation of the receiver node;

setting the transmitter node to a protect state in response to the generation of the continue command to protect a predetermined operation of the transmitter node from being interrupted; and releasing the protect state in response to the generation of the release command.

2. A data transmission method according to claim 1, wherein the predetermined operation of the receiver node comprises a recording mode, and wherein the predetermined operation of the transmitter node comprises a playing mode.

3. A data transmission method according to claim 1, further comprising the step of resetting the protected state when the bus reset occurs.

4. A data transmission method according to claim 1, wherein the step of setting a protect state comprises protecting the transmitter node from an internal stop command transmitted over the bus, but not from an external stop command applied directly to the transmitter node.

5. A data transmission method according to claim 1, wherein the step of setting a protect state comprises setting the transmitter node to the protect state when the continue command is input directly to the transmitter node.

6. A data transmission method for transmitting real-time data over a bus between at least one of a first node and a second node of a plurality of nodes, in which the real-time data is combined with a channel identifier, data transmission method comprising the steps of:

reserving a preselected channel from among a plurality of channels, for use by the first node;

setting a required bandwidth of the preselected channel by the first node;

confirming that the preselected channel with the required bandwidth has been reserved by the first node;

transmitting data between the first node and the second node using the preselected channel with the required bandwidth;

generating a continue command, at the second node, to continue a predetermined operation of the second node;

generating a release command, at the second node, to release the predetermined operation of the second node;

setting the first node to a protect state in response to the generation of the continue command to protect a predetermined operation of the first node from being interrupted; and releasing the protect state in response to the generation of the release command.

7. A data transmission method according to claim 6, wherein the step of reserving a preselected channel comprises reserving a Broadcast channel, which is a prefixed channel.

8. A data transmission method for communicating real-time data packets over a bus, the communication being carried out by a first node and followed-up by a second node, in which at least one of the first node and the second node comprises a plurality of nodes, the data transmission method comprising the steps of:

detecting, by the second node, data packets produced by the first node to identify the first node;

sending a "stop output request" signal from the second node to the first node;

detecting, by the first node, the "stop output request" signal;

stopping, by the first node, a current communication through a preselected channel of a plurality of channels when the "stop output request" signal is accepted by the first node;

starting, by the second node, a follow-up communication through the preselected channel;

generating a continue command, at the second node, to continue a predetermined operation of the second node;

generating a release command, at the second node, to release the predetermined operation of the second node;

setting the first node to a protect state in response to the generation of the continue command to protect a predetermined operation of the first node from being interrupted; and releasing the protect state in response to the generation of the release command.

9. A data transmission method according to claim 8, further comprising the step of rejecting, by the first node, the "stop output request" signal when it is determined that the first node is unable to interrupt the current communication.

10. A data transmission method according to claim 8, further comprising the steps of:

detecting whether a bandwidth of the preselected channel used by the first node is equal to a bandwidth required by the second node; and changing the bandwidth of the preselected channel used by the first node to be equal to the bandwidth required by the second node when it is detected that the bandwidth of the preselected channel differs from the bandwidth required by the second node.

11. A data transmission method according to claim 9, further comprising the steps of:

sending a "stop output command" signal from the second node to the first node; and forcibly stopping, by the first node, the current communication through the preselected channel upon receipt of the "stop output command" signal, even when the first node determines it is unable to interrupt the current communication upon receipt of the "stop output request" signal.

12. A data transmission method for transmitting, in response to a transmission command produced from a control node, real-time data over a bus between at least a first node and a second node, in which at least one of the first node and the second node comprises a plurality of nodes, the real-time data being combined with a channel identifier, the data transmission method comprising the steps of:

reserving a preselected channel from among a plurality of channels, for use by the control node;

setting a required bandwidth, by the control node, for the preselected channel;

confirming that the preselected channel with the required bandwidth has been reserved by the control node;

transmitting data between the first node and the second node using the preselected channel with the required bandwidth;

generating a continue command, at the second node, to continue a predetermined operation of the second node;

generating a release command, at the second node, to release the predetermined operation of the second node;

setting the first node to a protect state in response to the generation of the continue command to protect a predetermined operation of the first node from being interrupted; and releasing the protect state in response to the generation of the release command.

13. A data transmission method according to claim 12, wherein the step of reserving a preselected channel comprises reserving a channel other than a Broadcast channel, which is a prefixed channel.

14. A data transmission system for transmitting data requiring real-time processing by isochronous packets using a bus from a transmitter node to a receiver node, in which at least one of said transmitter node and said receiver node comprise a plurality of nodes, said system comprising:

means for assigning a node identifier to each node connected to said bus whenever a bus reset occurs;

means for adding a node identifier associated with said transmitter node to said isochronous packets transmitted by said transmitter node;

means for detecting said node identifier associated with said transmitter node at said receiver node;

means for generating a continue command, at said receiver node, to continue a predetermined operation of said receiver node;

means for generating a release command, at said receiver node, to release said predetermined operation of said receiver node;

means for setting said transmitter node to a protect state in response to a generation of said continue command by said continue command generating means, to protect a predetermined operation of said transmitter node from being interrupted; and means for releasing said protect state in response to a generation of said release command by said release command generating means.

15. A data transmission system for transmitting real-time data over a bus between at least a first node and a second node, in which at least one of said first node and said second node comprises a plurality of nodes, said real-time data being added with a channel identifier, said system comprising:

means for reserving a preselected channel from among a plurality of channels by said first node;

means for setting a required bandwidth for said preselected channel by said first node;

means for confirming that said preselected channel with said required bandwidth has been reserved by said first node;

means for transmitting data between said first node and said second node using said preselected channel with said required bandwidth;

means for generating a continue command, by one of said first node and said second node, said continue command operating to receive data to continue a first predetermined operation;

means for generating a release command at one of said first node and said second node, said release command operating to receive data to release said first operation mode;

means for setting the other of said first node and said second node that operates to transmit data to a protect state in response to the generation of the continue command by said continue command generating means to protect a second predetermined operation from being interrupted; and means for releasing said protect state in response to the generation of said release command by said release command generating means.

16. A data transmission system for communicating real-time data packets over a bus, said communication being carried out by a first node and followed-up by a second node, in which at least one of said first node and said second node comprises a plurality of nodes, said data transmission system comprising:

first means for detecting data packets to identify said first node;

means for sending a "stop output request" signal from said second node to said first node;

second means for detecting said "stop output request" signal sent by said sending means, said second means being associated with said first node;

means for stopping said communication through a preselected channel of a plurality of channels when said "stop output request" signal sent by said sending means is accepted by said first node;

means for starting a follow-up communication of data through said preselected channel, said starting means being associated with said second node;

first means for generating a continue command, at said second node, to continue a predetermined operation of said second node;

second means for generating a release command, at said second node, to release said predetermined operation of said second node;

means for setting said first node to a protect state in response to a generation of said continue command by said first generating means to protect a predetermined operation of said first node from being interrupted; and means for releasing said protect state in response to a generation of said release command by said second generating means.

* * * * *